US010531443B2

(12) United States Patent
Yin et al.

(10) Patent No.: US 10,531,443 B2
(45) Date of Patent: Jan. 7, 2020

(54) PHYSICAL UPLINK CONTROL CHANNEL (PUCCH) FORMAT ADAPTATION FOR 5TH GENERATION (5G) NEW RADIO (NR)

(71) Applicants: Sharp Kabushiki Kaisha, Sakai-ku, Sakai, Osaka (JP); FG Innovation Company Limited, New Territories, Hong Kong (CN)

(72) Inventors: Zhanping Yin, Vancouver, WA (US); Toshizo Nogami, Chiba (JP)

(73) Assignees: Sharp Kabushiki Kaisha, Osaka (JP); FG Innovation Company Limited, Hong Kong (CN)

( * ) Notice: Subject to any disclaimer, the term of this patent is extended or adjusted under 35 U.S.C. 154(b) by 28 days.

(21) Appl. No.: 16/008,492

(22) Filed: Jun. 14, 2018

(65) Prior Publication Data

US 2018/0368137 A1 Dec. 20, 2018

Related U.S. Application Data

(63) Continuation of application No. PCT/US2018/037377, filed on Jun. 13, 2018.

(60) Provisional application No. 62/520,520, filed on Jun. 15, 2017.

(51) Int. Cl.
*H04W 72/04* (2009.01)
*H04L 1/18* (2006.01)

(52) U.S. Cl.
CPC ....... *H04W 72/0413* (2013.01); *H04L 1/1861* (2013.01); *H04W 72/0486* (2013.01)

(58) Field of Classification Search
CPC .......... H04W 72/0413; H04W 72/0486; H04L 1/1861; H04L 5/0057; H04L 1/1854; H04L 5/0055; H04L 5/0091; H04L 5/0053; H04L 5/001
See application file for complete search history.

(56) References Cited

U.S. PATENT DOCUMENTS

| 2017/0041123 A1 | 2/2017 | Yang et al. |
| 2018/0167932 A1* | 6/2018 | Papasakellariou .... H04L 1/1671 |
| 2018/0176943 A1 | 6/2018 | Takeda et al. |

(Continued)

FOREIGN PATENT DOCUMENTS

| WO | 2013071028 A2 | 5/2013 |
| WO | 2016208727 A1 | 12/2016 |
| WO | 2017018839 A1 | 2/2017 |

OTHER PUBLICATIONS

Samsung, "Resource Allocation for PUCCH with HARQ-ACK", 3GPP TSG RAN WG1 Meeting #89, Hangzhou, P.R. China, R1-1708009, May 19, 2017.

(Continued)

*Primary Examiner* — Jay P Patel
(74) *Attorney, Agent, or Firm* — Austin Rapp

(57) ABSTRACT

A user equipment (UE) is described. The UE includes a processor and memory in electronic communication with the processor. Instructions stored in the memory are executable to determine uplink control channel (PUCCH) formats and configuration based on a signaling from a base station (gNB). The instructions are also executable to determine a control channel format and resource for uplink control information (UCI) feedback. The instructions are further executable to transmit UCI on a selected channel.

5 Claims, 18 Drawing Sheets

(56) References Cited

U.S. PATENT DOCUMENTS

| | | | | |
|---|---|---|---|---|
| 2018/0278368 A1* | 9/2018 | Kim | ................... | H04L 1/1829 |
| 2018/0287745 A1* | 10/2018 | Sun | ................... | H04L 1/1864 |
| 2018/0368110 A1* | 12/2018 | Ying | ................... | H04W 72/04 |
| 2019/0199477 A1* | 6/2019 | Park | ................... | H04L 1/00 |
| 2019/0230685 A1* | 7/2019 | Park | ................... | H04L 5/00 |
| 2019/0245648 A1* | 8/2019 | Jo | ................... | H04L 1/0026 |

OTHER PUBLICATIONS

Intel Corporation, "Resource allocation for NR uplink control channel", 3GPP TSG RAN WG1 Meeting #88bis, Spokane, USA, R1-1704753, Apr. 7, 2017.

International Search Report and Written Opinion issued for PCT Application No. PCT/US2018/037377 dated Sep. 26, 2018.

Ericsson, "On PUCCH resource allocation", 3GPP TSG-RAN WG1 #89, Hangzhou, China, R1-1709087, May 19, 2017.

MediaTek Inc., "On multiple HARQ bits per TB and feedback mechanism", 3GPP TSG RAN WG1 Meeting #88, Athens, Greece, R1-1702738, Feb. 17, 2017.

\* cited by examiner

PHYSICAL UPLINK CONTROL CHANNEL (PUCCH) FORMAT ADAPTATION FOR 5TH GENERATION (5G) NEW RADIO (NR)

RELATED APPLICATIONS

This application is related to and claims priority from U.S. Provisional Patent Application No. 62/520,520, entitled "PHYSICAL UPLINK CONTROL CHANNEL (PUCCH) FORMAT ADAPTATION FOR 5th GENERATION (5G) NEW RADIO (NR)," filed on Jun. 15, 2017, which is hereby incorporated by reference herein, in its entirety.

TECHNICAL FIELD

The present disclosure relates generally to communication systems. More specifically, the present disclosure relates to physical uplink control channel (PUCCH) format adaptation for 5th generation (5G) new radio (NR).

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
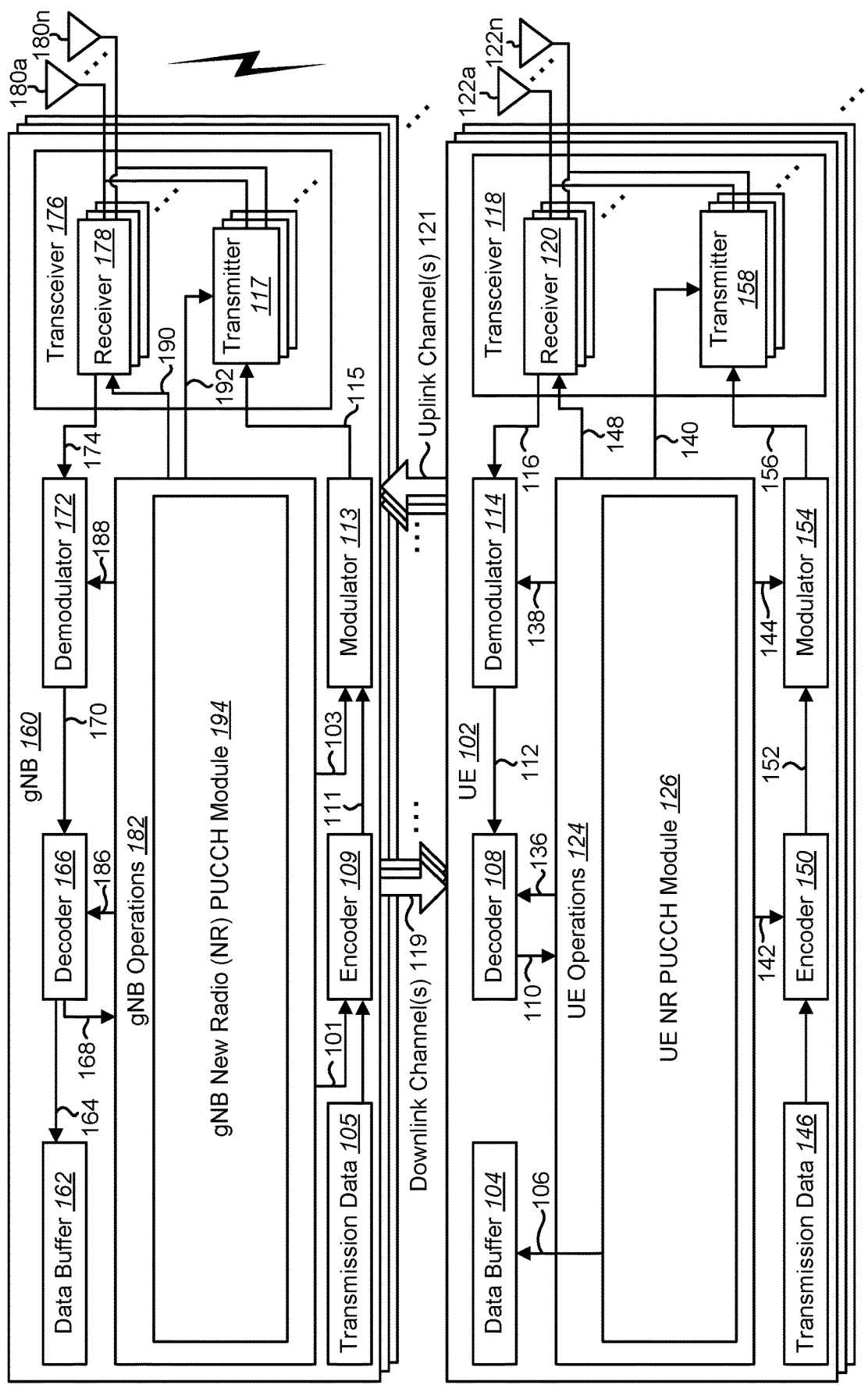
FIG. 1 is a block diagram illustrating one implementation of one or more base stations (gNBs) and one or more user equipments (UEs) in which systems and methods for physical uplink control channel (PUCCH) format adaptation for 5th generation (5G) new radio (NR) may be implemented.

A user equipment (UE) is described. The UE includes a processor and memory in electronic communication with the processor. Instructions stored in the memory are executable to determine uplink control channel (PUCCH) formats and configuration based on a signaling from a base station (gNB). The instructions are also executable to determine a control channel format and resource for uplink control information (UCI) feedback. The instructions are further executable to transmit UCI on a selected channel.

Determining the PUCCH format and configuration may include receiving a configuration signaling from the gNB with one or multiple PUCCH resources or sets of PUCCH resources with different PUCCH payload capacity. The PUCCH resource may have a short PUCCH format or a long PUCCH format. The short PUCCH format and the long PUCCH format may have the same or different waveforms and/or numerologies.

The control channel format and resource for hybrid-ARQ acknowledgements (HARQ-ACK) feedback may be implicitly determined by a HARQ-ACK feedback status and payload size. For code block group (CBG)-based HARQ-ACK reporting of a single physical downlink shared channel (PDSCH) transmission, if all CBGs in a transport block (TB) are reported as ACK, a single ACK may be reported for the TB on a PUCCH format and resource with up to 2 bits of payload. For CBG-based HARQ-ACK reporting of a single PDSCH transmission, if a NACK is reported for any CBG in a TB, the HARQ-ACK of at least all transmitted CBGs may be reported on a PUCCH format resource with a higher payload.

For HARQ-ACK feedback of a multiple PDSCH transmission, if all TBs of the PDSCHs are reported as ACK, a single ACK may be reported for all PDSCHs on a PUCCH format and resource with up to 2 bits of payload. For HARQ-ACK feedback of a multiple PDSCH transmission, if a NACK is reported for any TB in any PDSCH, the HARQ-ACK of at least all transmitted PDSCHs may be reported on a PUCCH format resource with a higher payload.

The control channel format and resource for HARQ-ACK feedback may be implicitly determined by the scheduling space for CBG-based HARQ-ACK. If a PDSCH is scheduled in common search space (CSS) or UE-group search space, the UE may report only one bit per TB or per PDSCH on a PUCCH format with up to two bits of UCI payload. If the PDSCH is scheduled in UE-specific search space (USS), the UE may report HARQ-ACK bits for at least all transmitted CBGs on a PUCCH format with up to two bits of UCI payload.

The control channel format and resource for UCI feedback may be implicitly determined by the payload size of a UCI reporting among configured PUCCH resources with different formats and payload sizes. The control channel format and resource with a given payload capacity may be explicitly signaled by the gNB for UCI feedback.

For HARQ-ACK reporting of carrier aggregation and/or multiple PDSCH transmissions in a carrier, the UE may receive a total number of PDSCH transmissions for a HARQ-ACK reporting from the gNB.

A base station (gNB) is also described. The gNB includes a processor and memory in electronic communication with the processor. Instructions stored in the memory are executable to receive uplink control information (UCI), from a user equipment (UE), on a selected channel. The UE determines uplink control channel (PUCCH) formats and configuration based on a signaling from the gNB. The UE also determines a control channel format and resource for the UCI feedback.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio", "New Radio Access Technology" or "NR" by 3GPP) envisions the use of time/frequency/space resources to allow for enhanced mobile broadband (eMBB) communication and ultra-reliable low latency communication (URLLC) services, as well as massive machine type communication (mMTC) like services. In order for the services to use the time/frequency/space medium efficiently it would be useful to be able to flexibly schedule services on the medium so that the medium may be used as effectively as possible, given the conflicting needs of URLLC, eMBB, and mMTC. A new radio base station may be referred to as a gNB. A gNB may also be more generally referred to as a base station device.

In 5G NR, at least two different types of uplink control channel (PUCCH) formats may be specified: at least one short PUCCH format and one long PUCCH format. The PUCCH channel is designed to carry uplink control information (UCI). In NR, multiple short PUCCH formats and multiple long PUCCH formats may be defined, and the PUCCH formats of a UE may be configured by a base station.

The PUCCH resource allocation and indication are important aspects for NR operations. One of the most important UCI is hybrid-ARQ acknowledgements (HARQ-ACK)

feedback for DL transmissions. A PUCCH for HARQ-ACK feedback may be determined explicitly or implicitly. However, the number of HARQ-ACK bits in a NR PUCCH report may vary dramatically based on the scheduling and configurations, and the number of HARQ-ACK bits may be much larger than that of a LTE feedback in some cases.

To satisfy the performance requirements of HARQ-ACK feedback, the gNB has to configure PUCCH resources to carry HARQ-ACK feedback based on the maximum target payload. This may cause very conservative PUCCH resource reservation, and significantly increase the PUCCH resource overhead.

The systems and methods described herein teach dynamic PUCCH format adaptation based on the HARQ-ACK feedback status and scheduling indications. In an aspect, a switch between a long PUCCH and a short PUCCH is described herein. In another aspect, a switch between different PUCCH formats of the same duration or PUCCH category is described herein.

Several dynamic PUCCH format adaptation methods are described herein. A first method (Method 1) includes implicit PUCCH switching based on HARQ-ACK feedback status. For example, in a code block group (CBG)-based transmission, if all CBGs of the transport blocks (TBs) in a PDSCH transmission are acknowledged as ACK, the UE may report a single ACK for the TBs. Also, for HARQ-ACK feedback of multiple PDSCH transmissions, if all PDSCH are received correctly, the UE may report a single ACK for all PDSCHs.

A second method (Method 2) includes implicit PUCCH switching based on scheduling. For CBG-based HARQ-ACK, if a PDSCH is scheduled in a common search space (CSS), the UE may report one bit per TB on a PUCCH with small payload; if a PDSCH is scheduled in a UE-specific search space (USS), the UE may report HARQ-ACK bits of all CBGs on a PUCCH with a large payload.

A third method (Method 3) includes implicit PUCCH format adaptation based payload sizes. A fourth method (Method 4) includes explicit PUCCH format indication.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for physical uplink control channel (PUCCH) format adaptation for 5th generation (5G) new radio (NR) may be implemented. The one or more UEs 102 communicate with one or more gNBs 160 using one or more antennas 122a-n. For example, a UE 102 transmits electromagnetic signals to the gNB 160 and receives electromagnetic signals from the gNB 160 using the one or more antennas 122a-n. The gNB 160 communicates with the UE 102 using one or more antennas 180a-n.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH and a PUSCH, etc. The one or more gNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE new radio (NR) PUCCH module 126.

The UE NR PUCCH module 126 may implement a PUCCH format adaptation for 5th generation (5G) new radio (NR). Uplink control information in NR is described. In LTE, the UCI carries hybrid-ARQ acknowledgements (HARQ-ACK), channel state information (CSI), and a scheduling request (SR). The CSI may include one or more of channel quality indicator (CQI), rank indication (RI), precoding matrix indicator (PMI), precoding type indicator (PTI), etc. Multiple dimensions of CSI may be reported from one or more cells to support FD-MIMO and CoMP operations.

Similarly, in NR, a scheduling request (SR), if defined, needs to be transmitted outside PUSCH, as well as HARQ-ACK for latency reasons. The CSI report in NR should be enhanced to support massive MIMO and beamforming methods. Thus, multiple sets of CSI may be reported in NR. Again, a CSI feedback may include one or more of CQI, RI, PMI, PTI, beam index, etc. At least two types of CSI reports may be supported, periodic CSI and aperiodic CSI. Periodic CSI report can be configured semi-statically. Aperiodic CSI can be trigger with a CSI request from the gNB 160. Therefore, physical uplink control signaling should be able to carry at least hybrid-ARQ acknowledgements, CSI reports (possibly including beamforming information), and scheduling requests.

The UCI information may be transmitted as L1/L2 control signaling (e.g., via a physical uplink control channel (PUCCH) or physical uplink share channel (PUSCH) or uplink data channel). Furthermore, it should be possible to dynamically indicate (at least in combination with RRC) the timing between data reception and hybrid-ARQ acknowledgement transmission as part of the downlink control information (DCI).

5G NR physical uplink control channel (PUCCH) is also discussed herein. For 5G NR, at least two transmission durations are supported for the uplink control channel (PUCCH). A short PUCCH format may include one or two symbols. A short PUCCH may provide fast HARQ-ACK response for low latency applications and can reduce the PUCCH overhead. The payload size of a short PUCCH can be lower than a long PUCCH. A long PUCCH format may span multiple symbols and slots. Multiple long PUCCH formats may be defined with at least 4 symbols that are within a slot, or span over multiple slots. A long PUCCH format may be useful for larger payload HARQ-ACK feedback, CSI feedback, etc.

For a short PUCCH, some or all the following parameters may be configured. One parameter is the number of symbols (i.e., 1 symbol or two symbols). Another parameter is the waveform (e.g., CP-OFDM or DFT-S-OFDM). The number of RBs in a PUCCH region/subband may be configured. The RS location, RS pattern and spreading sequence if applied may be configured. Another parameter is the spreading sequence on UCI data symbols if applied. Yet another parameter is frequency diversity with multiple PUCCH regions/subbands. Another parameter is transmit diversity with two configured PUCCH resources. The location of one or more configured PUCCH regions/subbands including size and position of each PUCCH subband/region in the carrier may be configured. Localized or distributed resource allocation for a PUCCH resource in a PUCCH region/subband may be configured.

For a long PUCCH, some or all of the following parameters may be configured for a given UE 102. One parameter is the waveform (e.g., DFT-S-OFDM or CP-OFDM).

A long PUCCH may occupy multiple RBs. The number of RBs of a long PUCCH may be configured (e.g., based on the payload size).

Another configurable parameter for long PUCCH is the length of a long PUCCH. A long PUCCH may have a minimum length of 4 symbols. A long PUCCH may occupy one or more slots. The length of a long PUCCH can be configurable based on the payload size and delay tolerance, etc.

Yet another configurable parameter for long PUCCH is the tradeoff between the number of RBs and the number of slots.

Additional configurable parameter for long PUCCH include the RS pattern and RS position; the spreading sequence for UCI multiplexing; frequency diversity with multiple PUCCH regions/subbands; transmit diversity with two configured PUCCH resources; the location of one or more configured PUCCH regions/subbands including size and position of each PUCCH subband/region in the carrier; and localized or distributed resource allocation for a PUCCH resource in a PUCCH region/subband.

Implementations for PUCCH format adaptation in NR are described herein. In LTE, multiple PUCCH formats are defined, including Format 1a/1b, Format 2/2a/2b, Format 3, Format 4 and Format 5, all with different PUCCH structures and maximum payload sizes. All PUCCH formats in LTE occupy one PRB only. PUCCH format adaptation is supported in several cases. For example, if PUCCH Format 3/4/5 is configured, fallback to Format 1a/1b occurs if only one PDSCH is detected on the PCell. The PUCCH format fallback reduces the PUCCH resource overhead. However, it does not reduce the latency for HARQ-ACK feedback since all PUCCH formats are 1 ms Transmission Time Interval (TTI) based.

In NR, a UE 102 may be configured to support only one PUCCH format (e.g., short PUCCH or long PUCCH). Additionally, a UE 102 may be configured to support both short and long PUCCH formats simultaneously. Different PUCCH formats have different characteristics and use cases. A short PUCCH may support a smaller payload size than long PUCCH. A short PUCCH provides faster feedback than a long PUCCH. A long PUCCH may provide a larger payload and better coverage than a short PUCCH.

For NR PUCCH format configuration, a combination of semi-static configuration and (at least for some types of UCI information) dynamic signaling may be used to determine the PUCCH formats and resources both for the long and short PUCCH formats.

In NR, multiple short PUCCH formats and multiple long PUCCH formats may be defined, and the PUCCH formats of a UE 102 may be configured by a base station (gNB) 160. In order to support time division multiplexing (TDM) of short PUCCH from different UEs 102 in the same slot, a mechanism to tell the UE 102 in which symbol(s) in a slot to transmit the short PUCCH on may be supported at least above 6 GHz. Similarly, for a long PUCCH, the gNB 160 may inform the UE 102 of the starting symbol and the duration of the long PUCCH transmission.

Depending on the payload size, coverage requirements etc., one NR PUCCH format may provide better performance than another NR PUCCH format. For example, faster feedback may be achieved by a short PUCCH, which can reduce the latency and round trip time (RTT) of a DL transmission and/or retransmission. Therefore, PUCCH format adaptation should be considered for NR UCI reporting.

Dynamic PUCCH format adaptation methods are described herein. For example, dynamic switching between a long PUCCH and a short PUCCH, and switching between PUCCH formats with different payloads are described. In particular, HARQ-ACK is described herein. However, PUCCH format adaptation may be applicable for other UCI transmissions as well.

HARQ-ACK is one of the most important information to be carried on PUCCH. The number of HARQ-ACK bits in a NR PUCCH report may be much larger than that of LTE and may vary dramatically based on the scheduling and configurations. For example, NR supports DL transmission in a slot, multiple slots, and slot aggregation. NR may further support min-slot. Thus, multiple min-slots can exist within a single slot. Furthermore, NR supports multiple HARQ-ACK feedback for a transport block (TB) (e.g., based on code block group (CBG)).

To satisfy the performance requirements of HARQ-ACK feedback, the gNB 160 may configure PUCCH resources to carry HARQ-ACK feedback based on the maximum target payload. However, this may cause very conservative PUCCH resource reservation, and significant increases in the PUCCH resource overhead.

Therefore, in some cases (e.g., if the number of HARQ-ACK bits is small or the HARQ-ACK bits can be bundled without losing information), it is better to switch from a high payload PUCCH to a low payload PUCCH when possible. At least two kinds of adaptation can be considered: (1) switch between a long PUCCH and a short PUCCH; and (2) switch between PUCCH with different payload capacity or resource overhead of the same format.

There are several benefits to switching between a high payload short PUCCH to a low payload short PUCCH, or switching between a high payload long PUCCH to a low payload long PUCCH. PUCCH resource overhead may be reduced. UE power consumption may be reduced for transmitting fewer symbols. More robustness and feedback reliability may be achieved.

Additionally, besides the above benefits, switching between a high payload long PUCCH and a low payload short PUCCH can also reduce latency for HARQ-ACK response and RTT.

Several methods for dynamic PUCCH format adaptation are described herein. To support PUCCH format adaptation, a gNB 160 may configure one or multiple sets of PUCCH resources for a UE 102. In an approach, each set of PUCCH resources may have the same PUCCH format and payload size; and multiple sets of PUCCH resources with different formats and payload sizes may be configured. In another approach, each set of PUCCH resources may have different PUCCH formats and payload; and multiple sets of PUCCH resource sets may be configured.

Furthermore, a PUCCH resource may be configured with multiple aggregation levels with the same basic resource block (RB) and slot structure. Each aggregation level may correspond to a different payload capacity. For example, a different number of RBs may be applied for different aggregation levels. The RB resources in an aggregation level may be localized in continuous RBs, or distributed within a control subband.

A first method (Method 1) includes implicit PUCCH switching based on HARQ-ACK feedback status. The implicit PUCCH switching may provide PUCCH adaptation without loss of HARQ-ACK feedback information.

In NR, code block group (CBG)-based transmission will support multiple HARQ-ACK bits for each TB. For example, a HARQ-ACK bit can be reported for each CBG in a TB. If any CBG is reported as NACK, the HARQ-ACK bits of at least all transmitted CBGs have to be reported. If all CBGs are reported as ACK, it is possible to bundle them into one ACK bit for each TB.

The implicit PUCCH switching can be applied for several use cases with CBG-based HARQ-ACK feedback. In a first case (Case 1), the UE 102 may send a PUCCH report corresponding to a single PDSCH only (e.g., in a frequency division duplexing (FDD) case). In a second case (Case 2), implicit PUCCH switching can be applied in carrier aggregation or dual connectivity where a PUCCH is associated with one DL transmission in each cell. In this case, the UE 102 may receive only one PDSCH on the PUCCH reporting cell (e.g., PCell or PSCell).

In method 1, the PUCCH switching may happen in the following approaches. In an example, a higher payload short PUCCH format is configured for HARQ-ACK feedback. If all CBGs of a TB are reported as ACK, the UE 102 may report only one ACK bit for the TB on a short PUCCH format with up to 2 bits UCI payload. The short PUCCH format with up to 2 bits UCI payload should have the same or a shorted length than the original short PUCCH format with higher payload. For example, if the short PUCCH with higher payload is a two-symbol PUCCH, the short PUCCH with up to two bits may be a one-symbol PUCCH or a two-symbol PUCCH.

In another example, a higher payload long PUCCH format is configured for HARQ-ACK feedback. If all CBGs of a TB are reported as ACK, the UE 102 should report only one ACK bit for the TB on a short PUCCH format with up to 2 bits UCI payload. The short PUCCH with up to two bits may be a one-symbol PUCCH or a two-symbol PUCCH.

In yet another example, a higher payload long PUCCH format is configured for HARQ-ACK feedback. If all CBGs of a TB are reported as ACK, the UE 102 should report only one ACK bit for the TB on a long PUCCH format of the same or shorter duration with up to 2 bits UCI payload.

The implicit PUCCH switching can also be applied for several use cases with multiple DL transmissions. In a third case (Case 3), for multi-slot scheduling by a single DCI, the HARQ-ACKs of multiple PDSCH transmissions may be reported in a single PUCCH. This can be applied for both time division duplex (TDD) and FDD cases. The multiple PDSCH transmissions can be continuous or discontinuous in time domain.

For a fourth case (Case 4), in carrier aggregation or dual connectivity, the total number of PDSCH transmissions may be signaled to the UE 102. In both cases (i.e., Case 3 and Case 4), one HARQ-ACK bit can be generated for each TB in each detected PDSCH. If the gNB 160 indicates the total number of PDSCH transmissions to a UE 102, the UE 102 can determine whether any of the PDSCH is detected correctly or not. If any TB in a PDSCH is reported as NACK, the HARQ-ACK bits of all transmitted PDSCHs may be reported. If all PDSCHs are detected correctly and reported as ACK, it is possible to bundle them into one ACK bit for all PDSCH transmissions.

In method 1, the PUCCH switching may happen in the following approaches. In an example, a higher payload short PUCCH format is configured for HARQ-ACK feedback. If PDSCHs are detected correctly and reported as ACK, the UE 102 may report only one ACK bit for all PDSCHs on a short PUCCH format with up to 2 bits UCI payload. The short PUCCH format with up to 2 bits UCI payload should have the same or a shorter length than the original short PUCCH format with higher payload. For example, if the short PUCCH with higher payload is a two-symbol PUCCH, the short PUCCH with up to two bits may be a one-symbol PUCCH or a two-symbol PUCCH.

In another example, a higher payload long PUCCH format is configured for HARQ-ACK feedback. If PDSCHs are detected correctly and reported as ACK, the UE 102 may report only one ACK bit for all PDSCHs on a short PUCCH format with up to 2 bits UCI payload. The short PUCCH with up to two bits may be a one-symbol PUCCH or a two-symbol PUCCH.

In yet another example, a higher payload long PUCCH format may be configured for HARQ-ACK feedback, if PDSCHs are detected correctly and reported as ACK, the UE 102 may report only one ACK bit for all PDSCHs on a long PUCCH format of the same or shorter duration with up to 2 bits UCI payload.

It should be noted that with implicit PUCCH adaptation based on HARQ-ACK status, only ACK can be reported on the compact PUCCH format with up to 2 bits of payload. For all cases above, the implicit PUCCH format adaptation may be viewed as fallback mode operation under certain conditions.

In a second method (Method 2), implicit PUCCH switching is based on scheduling. The implicit PUCCH switching can be applied for several use cases with CBG based HARQ-ACK feedback based on scheduling space at least for the same cases as follows.

As a special case in carrier aggregation (CA) or dual connectivity (DC), if only one PDSCH with TB based HARQ-ACK feedback is detected on a PUCCH reporting cell (e.g., a primary cell (PCell) or a primary secondary cell (PSCell)), a compact PUCCH format with up to 2 bits of payload may be used on the PUCCH reporting cell. In this case, both ACK or NACK can be carried on the PUCCH. In NR, a PUCCH reporting cell or carrier may be configured for CA or each DC group. The PUCCH reporting cell or carrier may be the same as the cell or carrier for the PDSCH transmission.

In a first case of Method 2, the UE 102 may send a PUCCH report corresponding to a single PDSCH only (e.g., in an FDD case). For a second case of Method 2, in carrier aggregation or dual connectivity where a PUCCH is associated with one DL transmission in each cell, the UE 102 may receive only one PDSCH on the PUCCH reporting cell (e.g., PCell or PSCell).

If CBG-based HARQ-ACK feedback is configured, and if the PDSCH is scheduled in common search space (CSS) or UE-group search space, the UE 102 may report only one bit per TB or per PDSCH on a PUCCH format with up to two bits of UCI payload. If the PDSCH is scheduled in UE specific search space, the UE 102 may report HARQ-ACK for at least all transmitted CBGs on a PUCCH format resource with a higher payload.

In this method, the PUCCH format and resource are not dependent on the status of HARQ-ACK feedback. Thus, either ACK or NACK may be reported on a compact PUCCH format with up to two bits of UCI payload.

In a third method (Method 3), implicit PUCCH format adaptation may be based payload sizes. Because different PUCCH payload sizes require different numbers of symbols and PRB resources, the PUCCH format may be adaptively adjusted based on payload sizes. To allow dynamic PUCCH adaptation based on payload size, different PUCCH resources with different payload capacities may be configured for a UE 102. The UE 102 may choose the best PUCCH resource based on the actual payload size of a feedback. In the case of HARQ-ACK reporting, to avoid ambiguity and false detection, the gNB 160 should signal to a UE 102 the total number of PDSCH transmissions for a PUCCH reporting. This is especially important for the case of carrier aggregation and/or multiple PDSCH transmissions in a carrier.

Switching from a high payload PUCCH to a low payload PUCCH includes at least two kinds of adaptation: (1) switching between a long PUCCH and a short PUCCH; and (2) switching between PUCCH with different payload capacity or resource overhead with of the same format (e.g., a high payload short PUCCH to a low payload short PUCCH, or a high payload long PUCCH to a low payload long PUCCH). This may be achieved by different aggregation levels of a given PUCCH format.

In general, the dynamic switched low payload PUCCH may use fewer resources than the original high payload PUCCH. For example, the number of symbols of the low payload short PUCCH should be smaller or equal to the number of symbols of the high payload short PUCCH. The number of symbols of the low payload long PUCCH should be smaller or equal to the number of symbols of the high payload long PUCCH. The number of allocated RBs of the low payload PUCCH should be smaller or equal to the number of allocated RBs of the high payload PUCCH.

A fourth method (Method 4) includes explicit PUCCH format indication. Since the gNB 160 performs the configuration of UCI reporting and the scheduling of data transmissions, the gNB 160 knows the payload size for a UCI feedback. Thus, the gNB 160 may explicitly indicate the most appropriate PUCCH resource used for UCI (e.g. HARQ-ACK) reporting.

The gNB 160 may indicate any PUCCH resource that is configured by higher layer signaling or implicitly derived based on scheduling DCI. The gNB 160 may indicate a PUCCH format and resource with a payload capacity that is the same as or larger than reported UCI payload from the UE 102. The gNB 160 may indicate an aggregation level for a given PUCCH format.

In some cases, the gNB 160 may indicate a PUCCH format and resource with a payload capacity that is smaller than reported UCI payload from the UE 102. Thus, the explicit signaling may be used to determine the HARQ-ACK feedback mechanism. For example, explicit signaling may be used to whether spatial bundling or time domain bundling is used on the HARQ-ACK bits. Whether CBG-based or TB based HARQ-ACK should be reported.

In one example, if the channel is good, the gNB 160 may indicate a PUCCH with small payload capacity, so that HARQ-ACK bundling or TB based HARQ-ACK can be applied to reduce the payload size. In another example, if an eMBB PDSCH transmission is punctured by a URLLC traffic, the gNB 160 may indicate a PUCCH resource with a large payload so that CBG-based HARQ-ACK is reported. Otherwise, the gNB 160 may indicate a PUCCH resource with small payload so that TB based HARQ-ACK is reported.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB NR PUCCH module 194. The gNB NR PUCCH module 194 may implement a PUCCH format adaptation for 5G NR as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
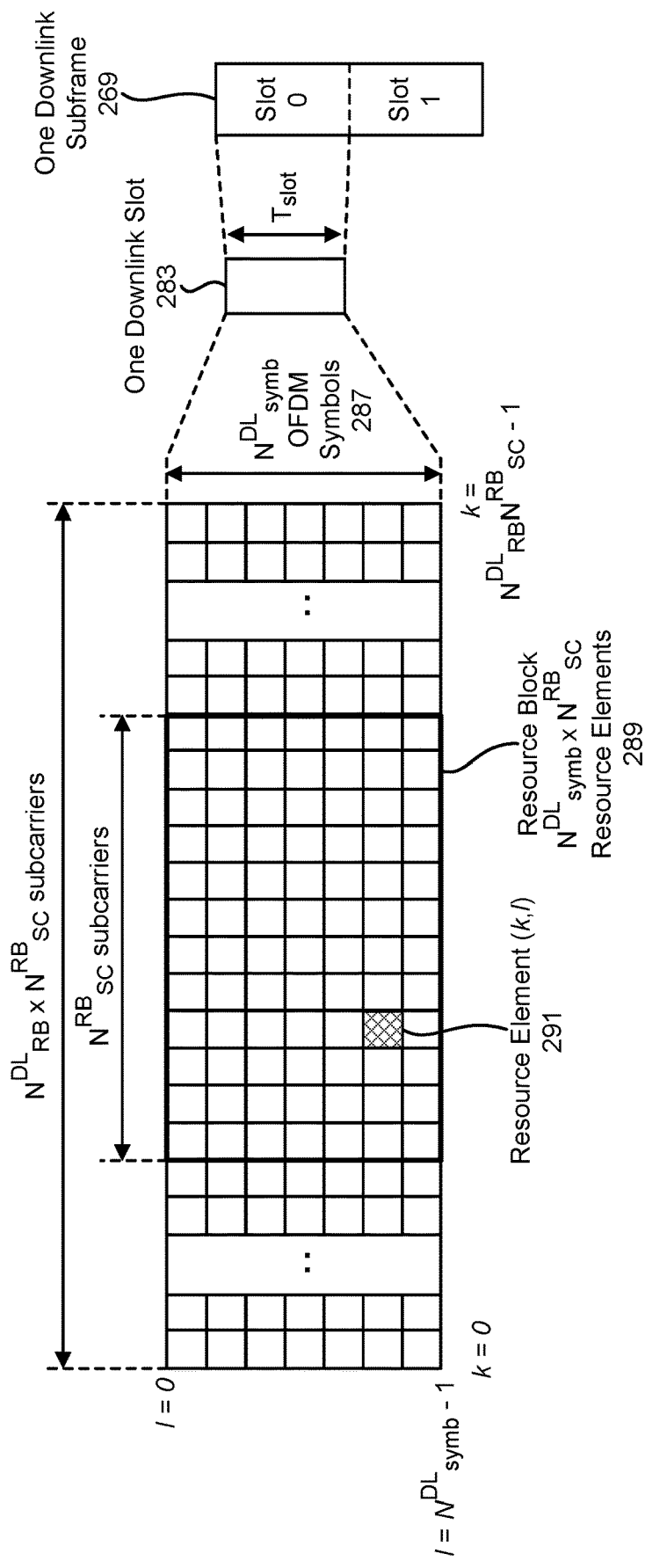
FIG. 2 is a diagram illustrating one example of a resource grid for the downlink.

FIG. 2 is a diagram illustrating one example of a resource grid for the downlink. The resource grid illustrated in FIG. 2 may be utilized in some implementations of the systems and methods disclosed herein. More detail regarding the resource grid is given in connection with FIG. 1.

In FIG. 2, one downlink subframe 269 may include two downlink slots 283. $N^{DL}_{RB}$ is downlink bandwidth configuration of the serving cell, expressed in multiples of $N^{RB}_{sc}$, where $N^{RB}_{sc}$ is a resource block 289 size in the frequency domain expressed as a number of subcarriers, and $N^{DL}_{symb}$ is the number of OFDM symbols 287 in a downlink slot 283. A resource block 289 may include a number of resource elements (RE) 291.

For a PCell, $N^{DL}_{RB}$ is broadcast as a part of system information. For an SCell (including an LAA SCell), $N^{DL}_{RB}$ is configured by a radio resource control (RRC) message dedicated to a UE 102. For PDSCH mapping, the available RE 291 may be the RE 291 whose index l fulfils $l \geq l_{data,start}$ and/or $l_{data,end} \geq l$ in a subframe.

In the downlink, the OFDM access scheme with cyclic prefix (CP) may be employed, which may be also referred to as CP-OFDM. In the downlink, PDCCH, EPDCCH, PDSCH and the like may be transmitted. A downlink radio frame may consist of multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair consists of two downlink RBs that are continuous in the time domain.

The downlink RB consists of twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 3:
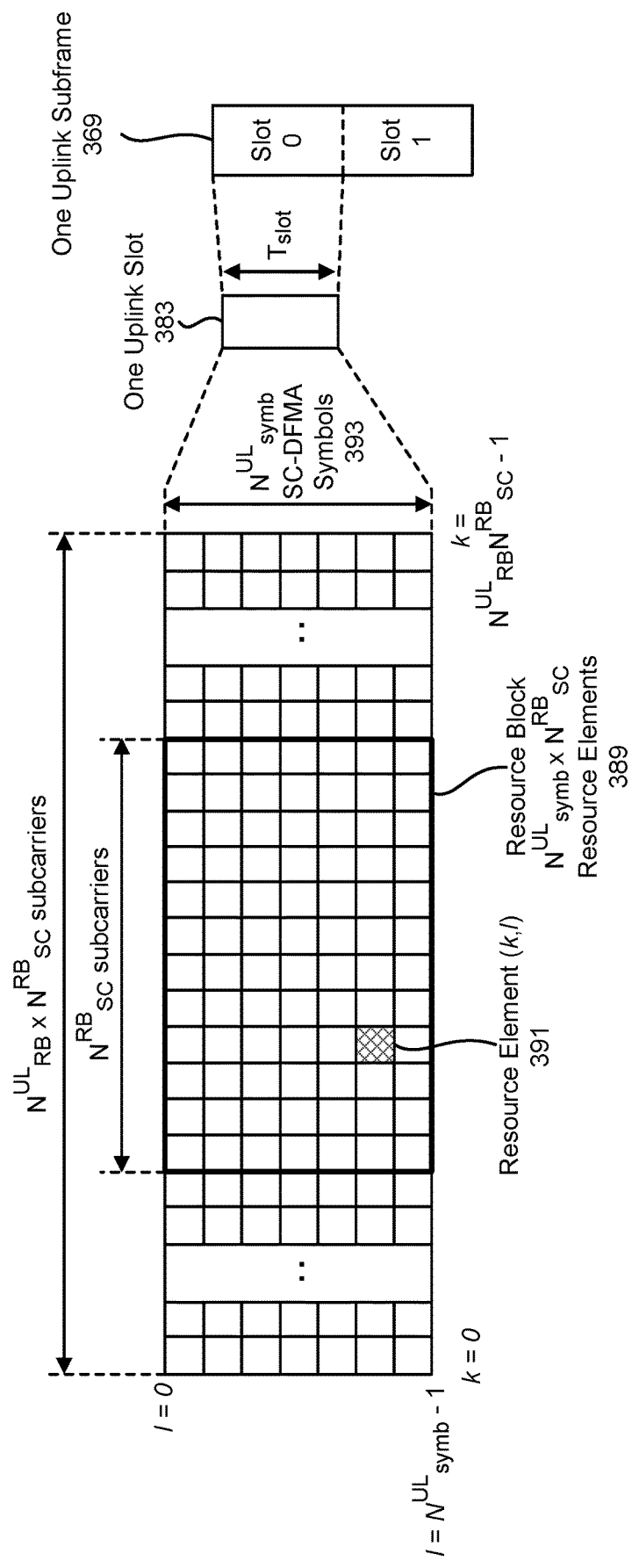
FIG. 3 is a diagram illustrating one example of a resource grid for the uplink.

FIG. 3 is a diagram illustrating one example of a resource grid for the uplink. The resource grid illustrated in FIG. 3 may be utilized in some implementations of the systems and methods disclosed herein. More detail regarding the resource grid is given in connection with FIG. 1.

In FIG. 3, one uplink subframe 369 may include two uplink slots 383. $N^{UL}_{RB}$ is uplink bandwidth configuration of the serving cell, expressed in multiples of $N^{RB}_{sc}$, where $N^{RB}_{sc}$ is a resource block 389 size in the frequency domain expressed as a number of subcarriers, and $N^{UL}_{symb}$ is the number of SC-FDMA symbols 393 in an uplink slot 383. A resource block 389 may include a number of resource elements (RE) 391.

For a PCell, $N^{UL}_{RB}$ is broadcast as a part of system information. For an SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PDSCH, PRACH and the like may be transmitted. An uplink radio frame may consist of multiple pairs of uplink resource blocks. The uplink RB pair is a unit for assigning uplink radio resources, defined by a predetermined bandwidth (RB bandwidth) and a time slot. The uplink RB pair consists of two uplink RBs that are continuous in the time domain.

The uplink RB may consist of twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC.

Figure 4:
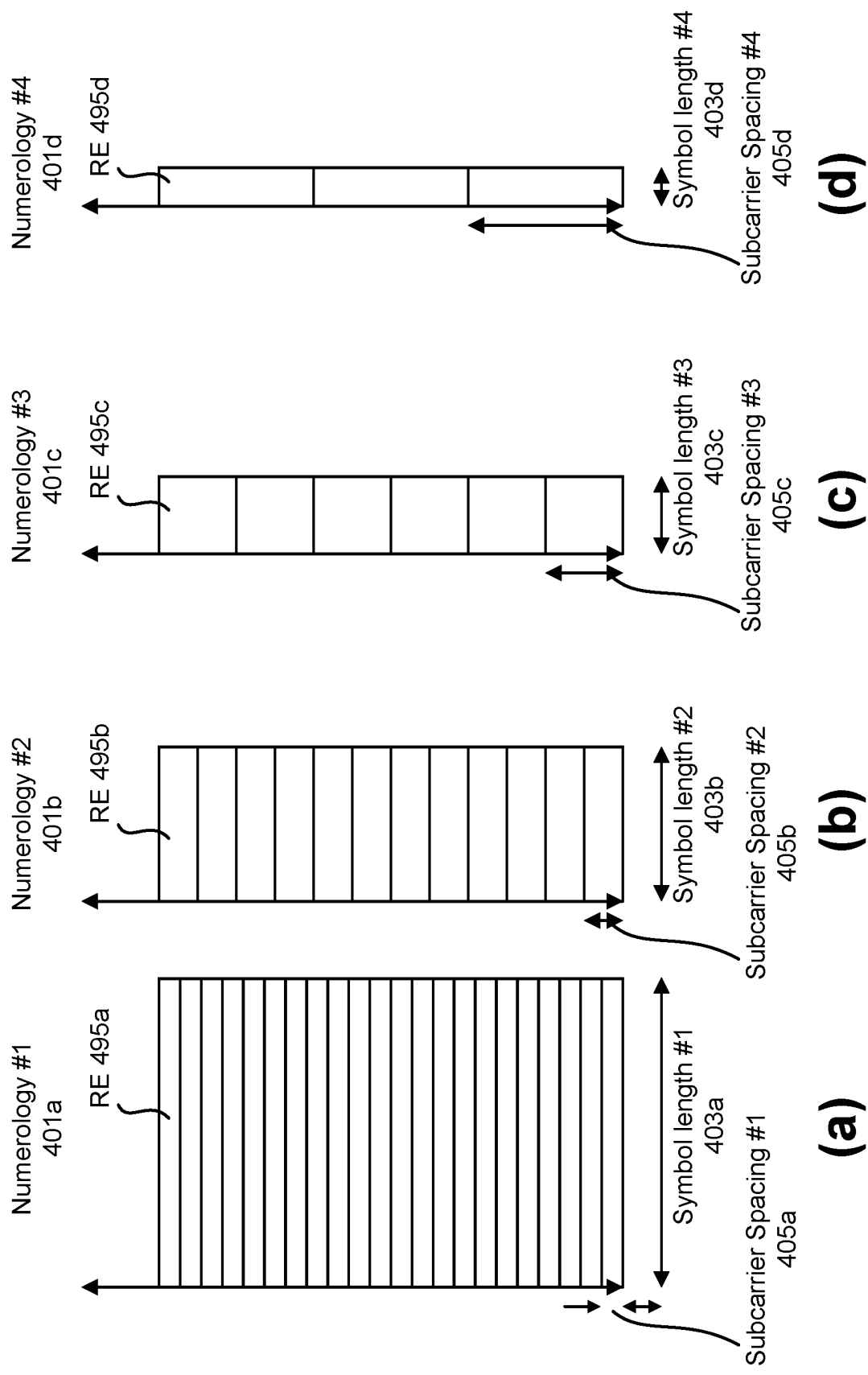
FIG. 4 shows examples of several numerologies.

FIG. 4 shows examples of several numerologies 401. The numerology #1 401a may be a basic numerology (e.g., a reference numerology). For example, a RE 495a of the basic numerology 401a may be defined with subcarrier spacing 405a of 15 kHz in frequency domain and 2048 Ts+CP length (e.g., 160 Ts or 144 Ts) in time domain (i.e., symbol length #1 403a), where Ts denotes a baseband sampling time unit defined as 1/(15000*2048) seconds. For the i-th numerology, the subcarrier spacing 405 may be equal to $15*2^i$ and the effective OFDM symbol length $2048*2^{-i}*Ts$. It may cause the symbol length is $2048*2^i*Ts+CP$ length (e.g., $160*2^{-i}*Ts$ or $144*2^{-i}*Ts$). In other words, the subcarrier spacing of the i+1-th numerology is a double of the one for the i-th numerology, and the symbol length of the i+1-th numerology is a half of the one for the i-th numerology.

In Numerology #2 401b, the RE 495b may be defined with symbol length #2 403b and subcarrier spacing #2 405b. In Numerology #3 401c, the RE 495c may be defined with symbol length #3 403c and subcarrier spacing #3 405c. In Numerology #4 401d, the RE 495d may be defined with symbol length #4 403d and subcarrier spacing #4 405d.

While four numerologies 401a-d are shown in FIG. 4, the system may support another number of numerologies 401. Furthermore, the system does not have to support all of the 0-th to the I-th numerologies 401, i=0, 1, . . . , I.

Figure 5:
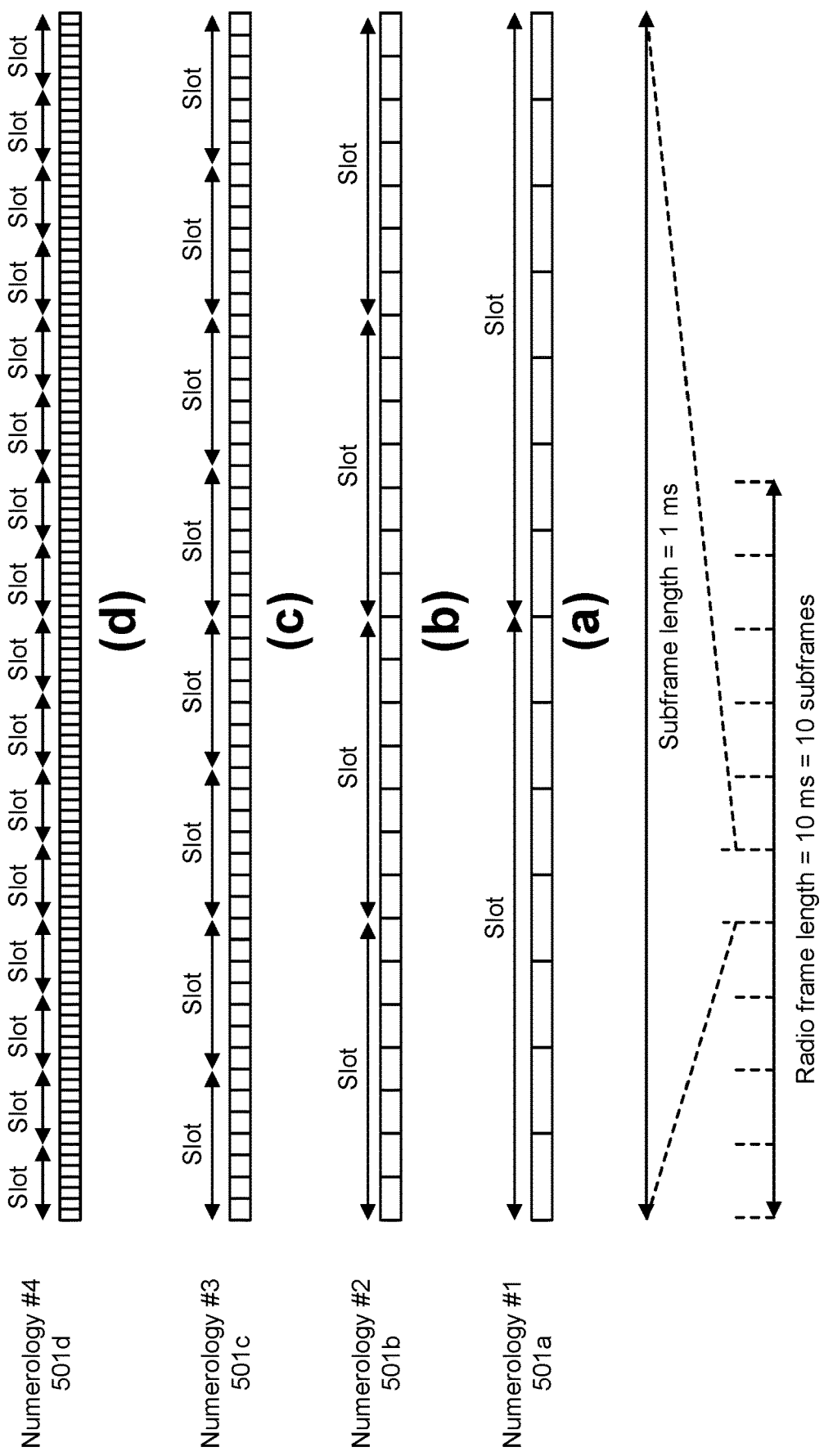
FIG. 5 shows examples of subframe structures for the numerologies that are shown in FIG. 4.

FIG. 5 shows examples of subframe structures for the numerologies 501 that are shown in FIG. 4. Given that a slot 283 includes $N^{DL}_{symb}$ (or $N^{UL}_{symb}$)=7 symbols, the slot length of the i+1-th numerology 501 is a half of the one for the i-th numerology 501, and eventually the number of slots 283 in a subframe (i.e., 1 ms) becomes double. It may be noted that a radio frame may include 10 subframes, and the radio frame length may be equal to 10 ms.

Figure 6:
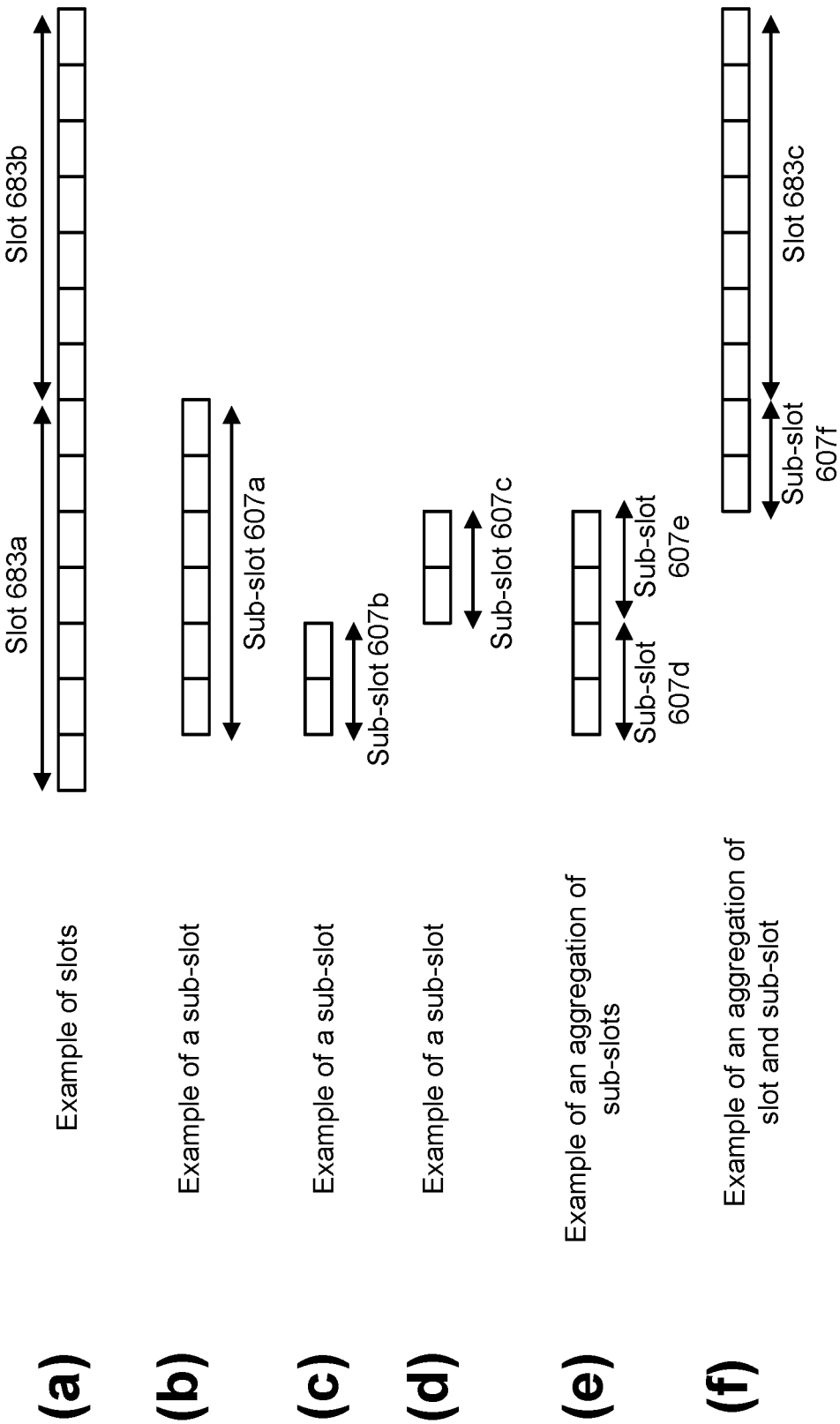
FIG. 6 shows examples of slots and sub-slots.

FIG. 6 shows examples of slots 683 and sub-slots 607. If a sub-slot 607 is not configured by higher layer, the UE 102 and the eNB/gNB 160 may only use a slot 683 as a scheduling unit. More specifically, a given transport block may be allocated to a slot 683. If the sub-slot 607 is configured by higher layer, the UE 102 and the eNB/gNB 160 may use the sub-slot 607 as well as the slot 683. The sub-slot 607 may include one or more OFDM symbols. The maximum number of OFDM symbols that constitute the sub-slot 607 may be $N^{DL}_{symb}-1$ (or $N^{UL}_{symb}-1$).

The sub-slot length may be configured by higher layer signaling. Alternatively, the sub-slot length may be indicated by a physical layer control channel (e.g., by DCI format).

The sub-slot 607 may start at any symbol within a slot 683 unless it collides with a control channel. There could be restrictions of mini-slot length based on restrictions on starting position. For example, the sub-slot 607 with the length of $N^{DL}_{symb}-1$ (or $N^{UL}_{symb}-1$) may start at the second symbol in a slot 683. The starting position of a sub-slot 607 may be indicated by a physical layer control channel (e.g., by DCI format). Alternatively, the starting position of a sub-slot 607 may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot 607.

In cases when the sub-slot 607 is configured, a given transport block may be allocated to either a slot 683, a sub-slot 607, aggregated sub-slots 607 or aggregated sub-slot(s) 607 and slot 683. This unit may also be a unit for HARQ-ACK bit generation.

Example (a) illustrates slots 683a-b with seven symbols. Example (b) illustrates a sub-slot 607a of six symbols. Example (c) illustrates a sub-slot 607b of two symbols. Example (d) illustrates a sub-slot 607c of two symbols. Example (e) illustrates an aggregation of sub-slots 607d-e. Example (f) illustrates an aggregation of a sub-slot 607f and a slot 683c.

Figure 7:
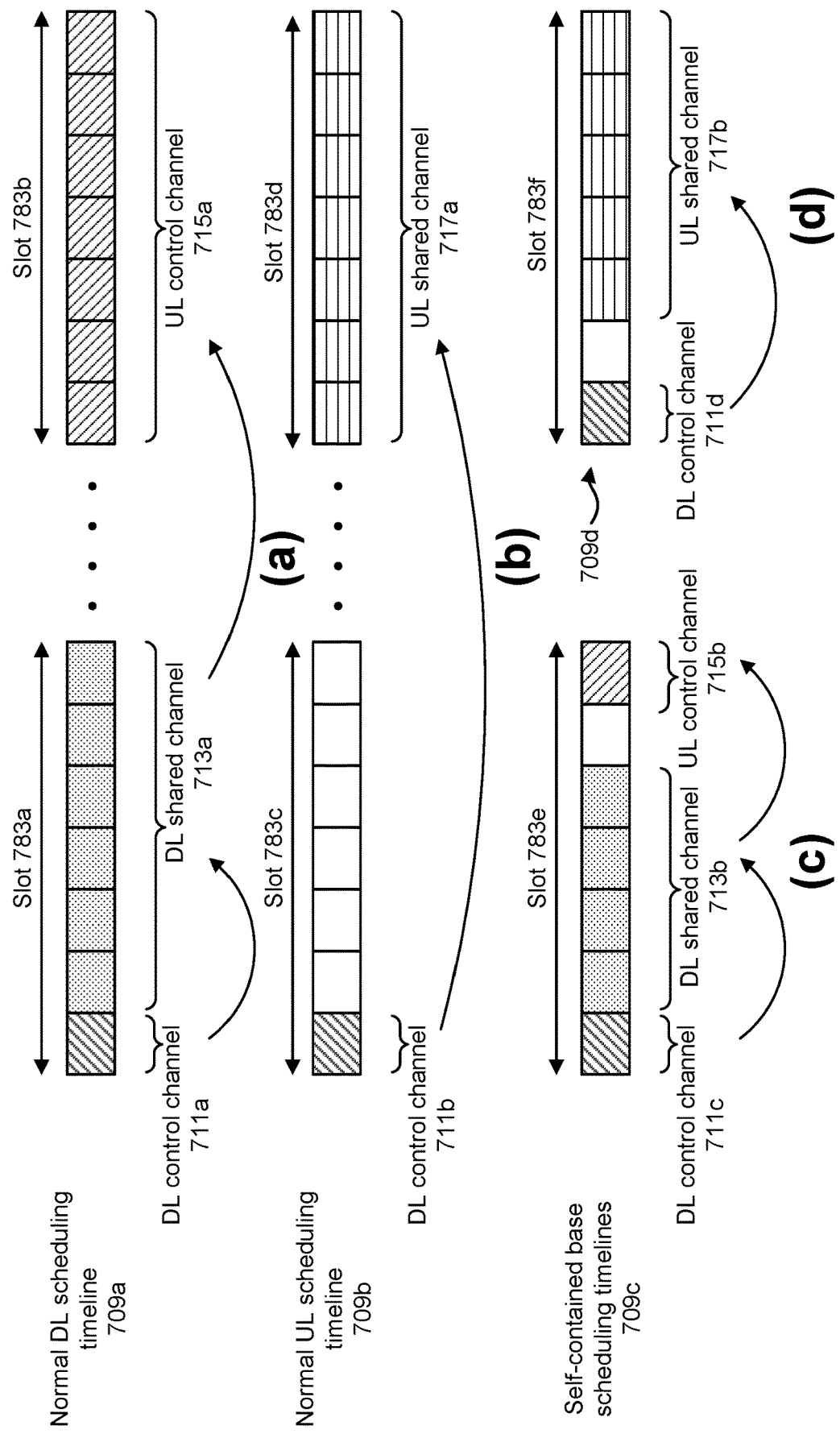
FIG. 7 shows examples of scheduling timelines.

FIG. 7 shows examples of scheduling timelines 709. For a normal DL scheduling timeline 709a, DL control channels are mapped the initial part of a slot 783a. The DL control channels 711 schedule DL shared channels 713a in the same slot 783a. HARQ-ACKs for the DL shared channels 713a (i.e., HARQ-ACKs each of which indicates whether or not transport block in each DL shared channel 713a is detected successfully) are reported via UL control channels 715a in a later slot 783b. In this instance, a given slot 783 may contain either one of DL transmission and UL transmission.

For a normal UL scheduling timeline 709b, DL control channels 711b are mapped the initial part of a slot 783c. The DL control channels 711b schedule UL shared channels 717a in a later slot 783d. For these cases, the association timing (time shift) between the DL slot 783c and the UL slot 783d may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 709c, DL control channels 711c are mapped to the initial part of a slot 783e. The DL control channels 711c schedule DL shared channels 713b in the same slot 783e. HARQ-ACKs for the DL shared channels 713b are reported in UL control channels 715b, which are mapped at the ending part of the slot 783e.

For a self-contained base UL scheduling timeline 709d, DL control channels 711d are mapped to the initial part of a slot 783f. The DL control channels 711d schedule UL shared channels 717b in the same slot 783f. For these cases, the slot 783f may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g., PDSCH, PUSCH, PUCCH, etc.).

Figure 8:
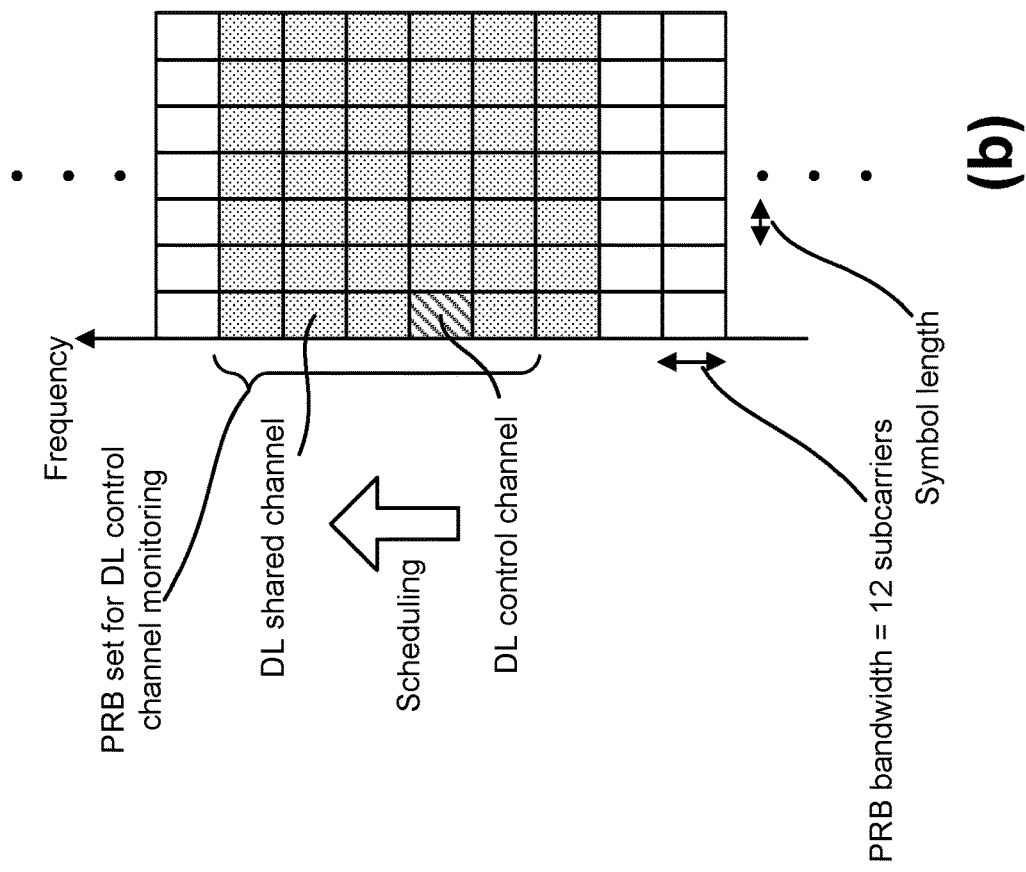
FIG. 8 shows examples of downlink (DL) control channel monitoring regions.
Figure 8:
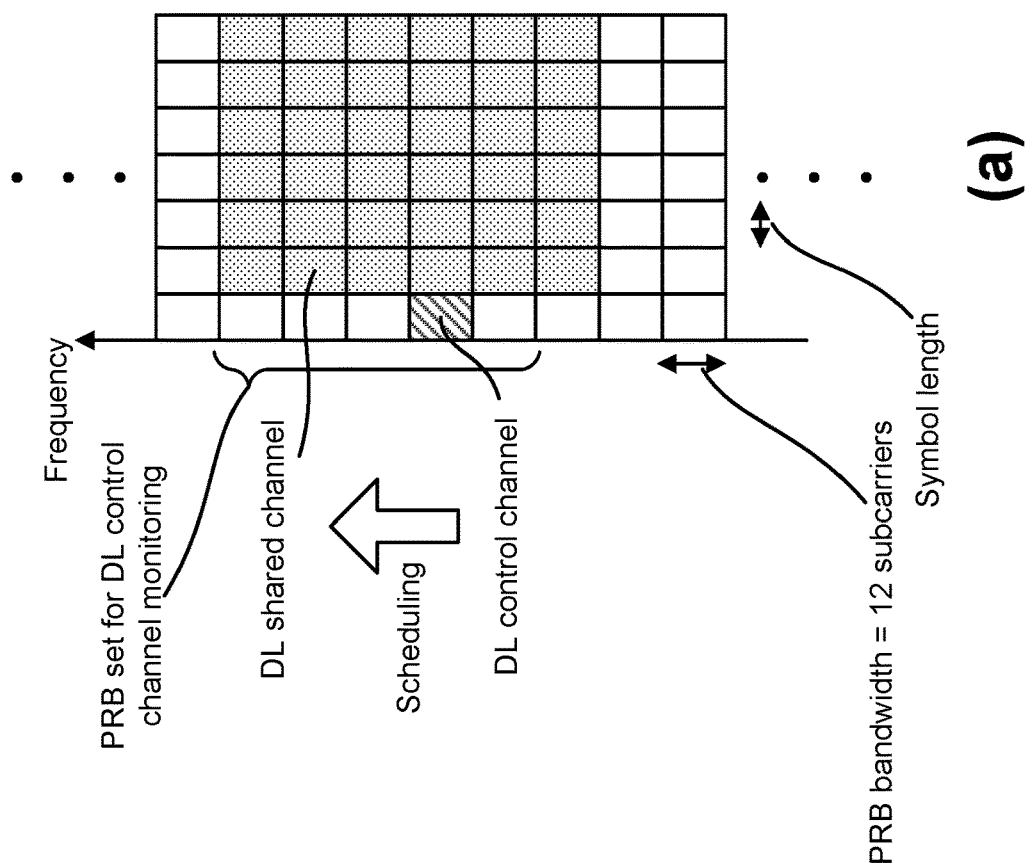

FIG. 8 shows examples of DL control channel monitoring regions. One or more sets of PRB(s) may be configured for DL control channel monitoring. In other words, a control resource set is, in the frequency domain, a set of PRBs within which the UE 102 attempts to blindly decode downlink control information, where the PRBs may or may not be frequency contiguous, a UE 102 may have one or more control resource sets, and one DCI message may be located within one control resource set. In the frequency-domain, a PRB is the resource unit size (which may or may not include a demodulation reference signal (DM-RS)) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Figure 9:
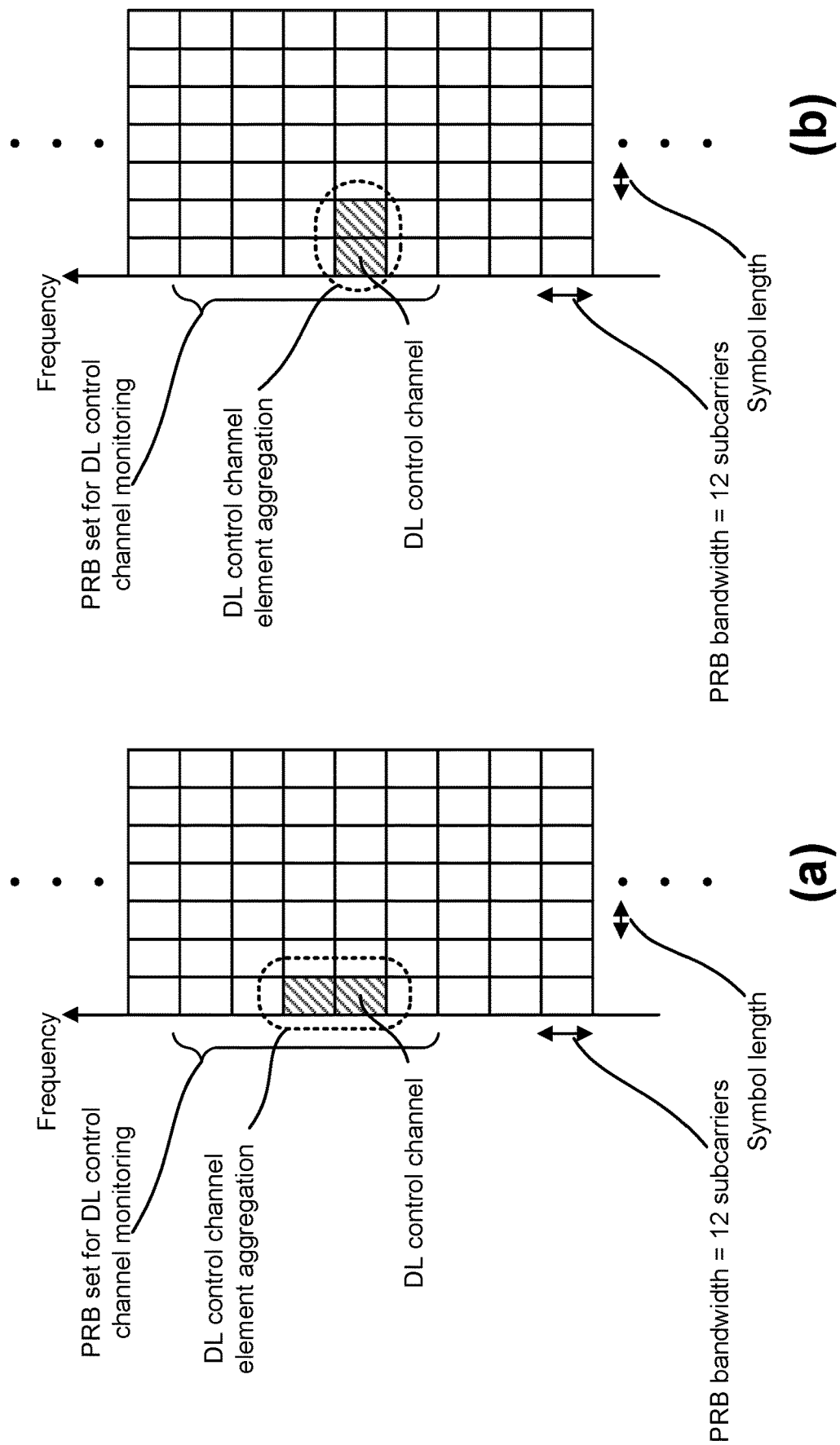
FIG. 9 shows examples of DL control channel which consists of more than one control channel elements.

FIG. 9 shows examples of DL control channel which includes more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

Figure 10:
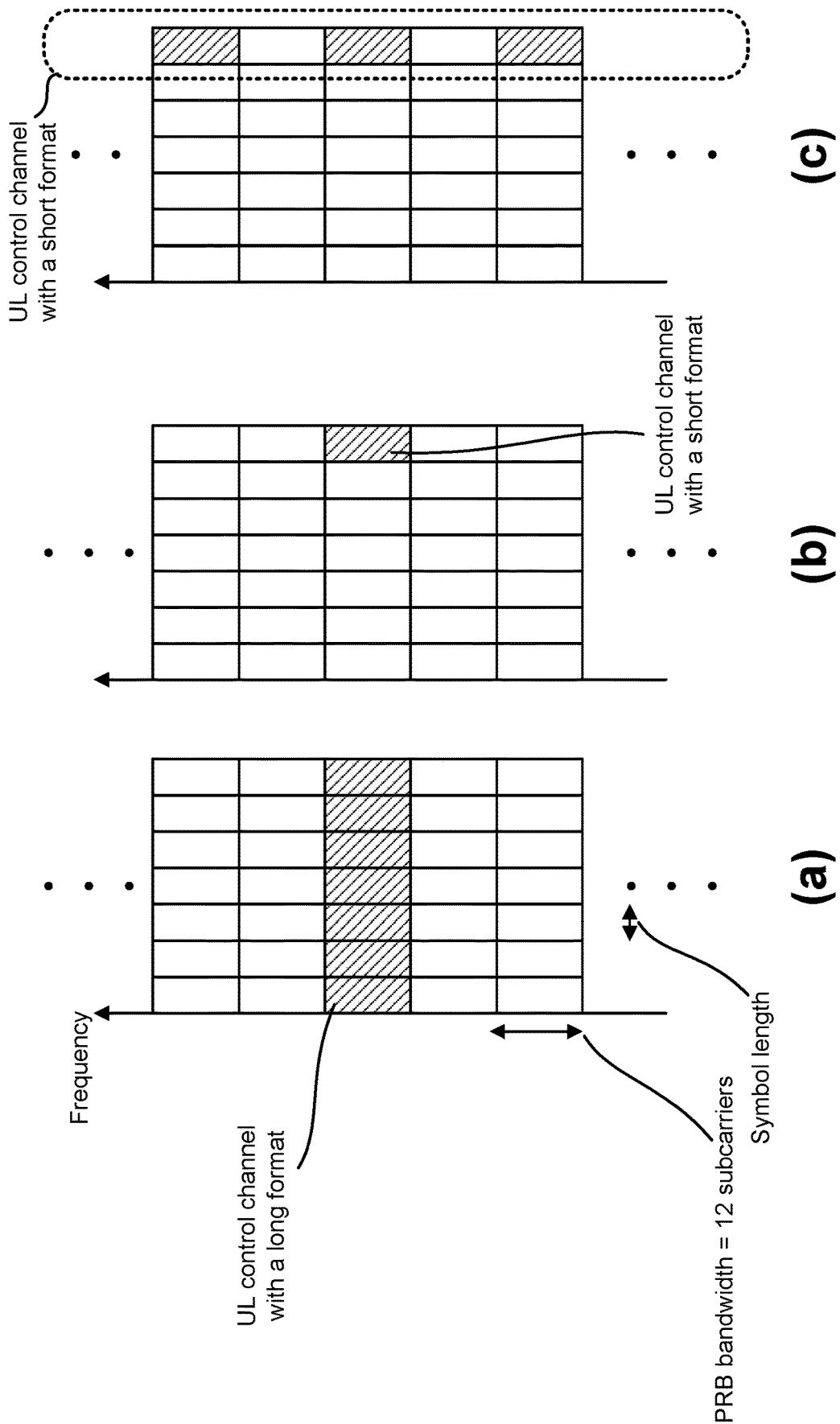
FIG. 10 shows examples of uplink (UL) control channel structures.

FIG. 10 shows examples of UL control channel structures. UL control channel may be mapped on REs which are defined a PRB and a slot in frequency and time domains, respectively. This UL control channel may be referred to as a long format (or just the 1st format). UL control channels may be mapped on REs on a limited OFDM symbols in time domain. This may be referred to as a short format (or just the 2nd format). The UL control channels with a short format may be mapped on REs within a single PRB. Alternatively, the UL control channels with a short format may be mapped on REs within multiple PRBs. For example, interlaced mapping may be applied, namely the UL control channel may be mapped to every N PRBs (e.g., 5 or 10) within a system bandwidth.

Figure 11:
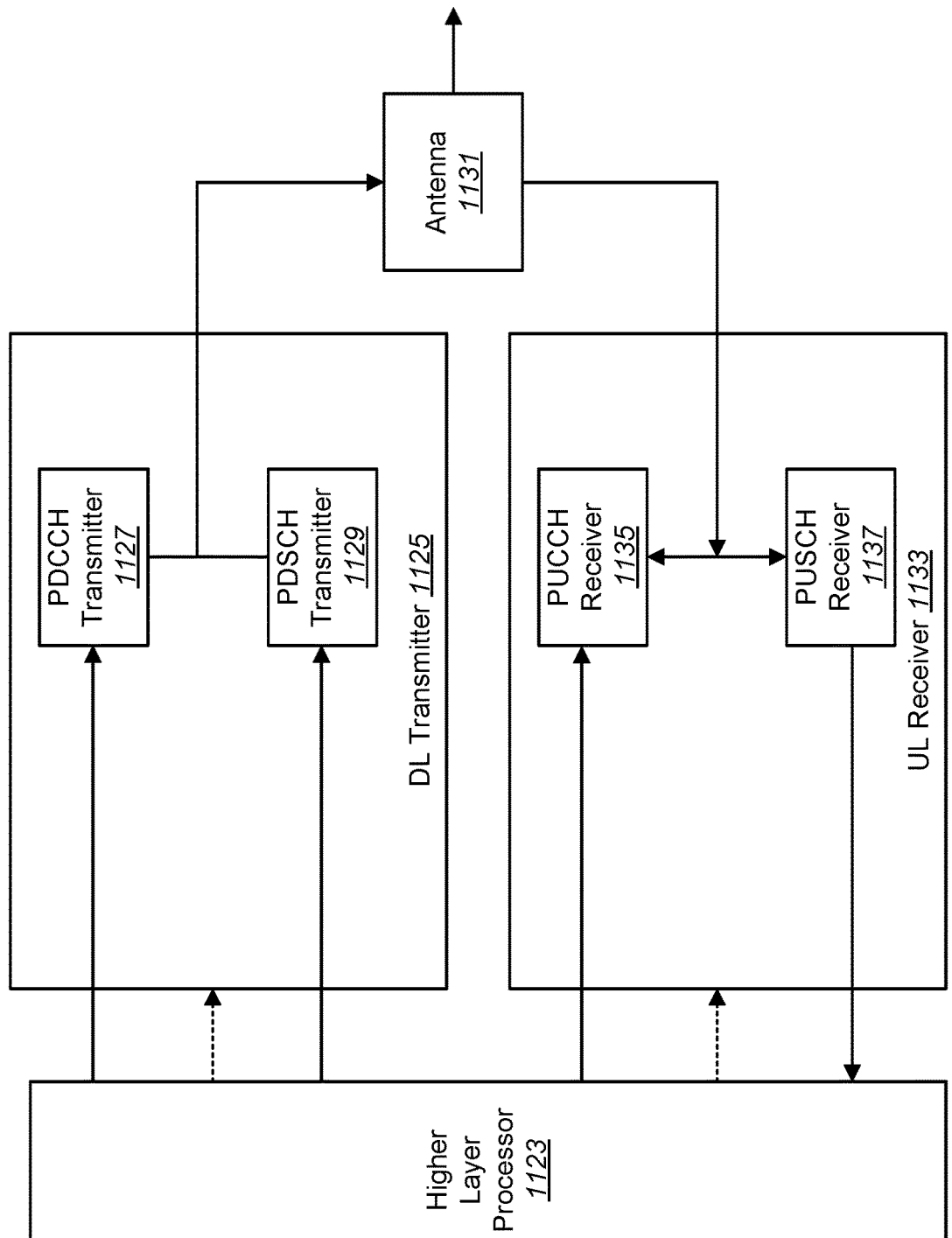
FIG. 11 is a block diagram illustrating one implementation of a gNB.

FIG. 11 is a block diagram illustrating one implementation of a gNB 1160. The gNB 1160 may include a higher layer processor 1123, a DL transmitter 1125, a UL receiver 1133, and one or more antenna 1131. The DL transmitter 1125 may include a PDCCH transmitter 1127 and a PDSCH transmitter 1129. The UL receiver 1133 may include a PUCCH receiver 1135 and a PUSCH receiver 1137.

The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send/acquire higher layer messages such as an RRC message and MAC message to/from a UE's higher layer. The higher layer processor 1123 may provide the PDSCH transmitter transport blocks and provide the PDCCH transmitter transmission parameters related to the transport blocks.

The DL transmitter 1125 may multiplex downlink physical channels and downlink physical signals (including reservation signal) and transmit them via transmission antennas 1131. The UL receiver 1133 may receive multiplexed uplink physical channels and uplink physical signals via receiving antennas 1131 and de-multiplex them. The PUCCH receiver 1135 may provide the higher layer processor 1123 uplink control information (UCI). The PUSCH receiver 1137 may provide the higher layer processor 1123 received transport blocks.

Figure 12:
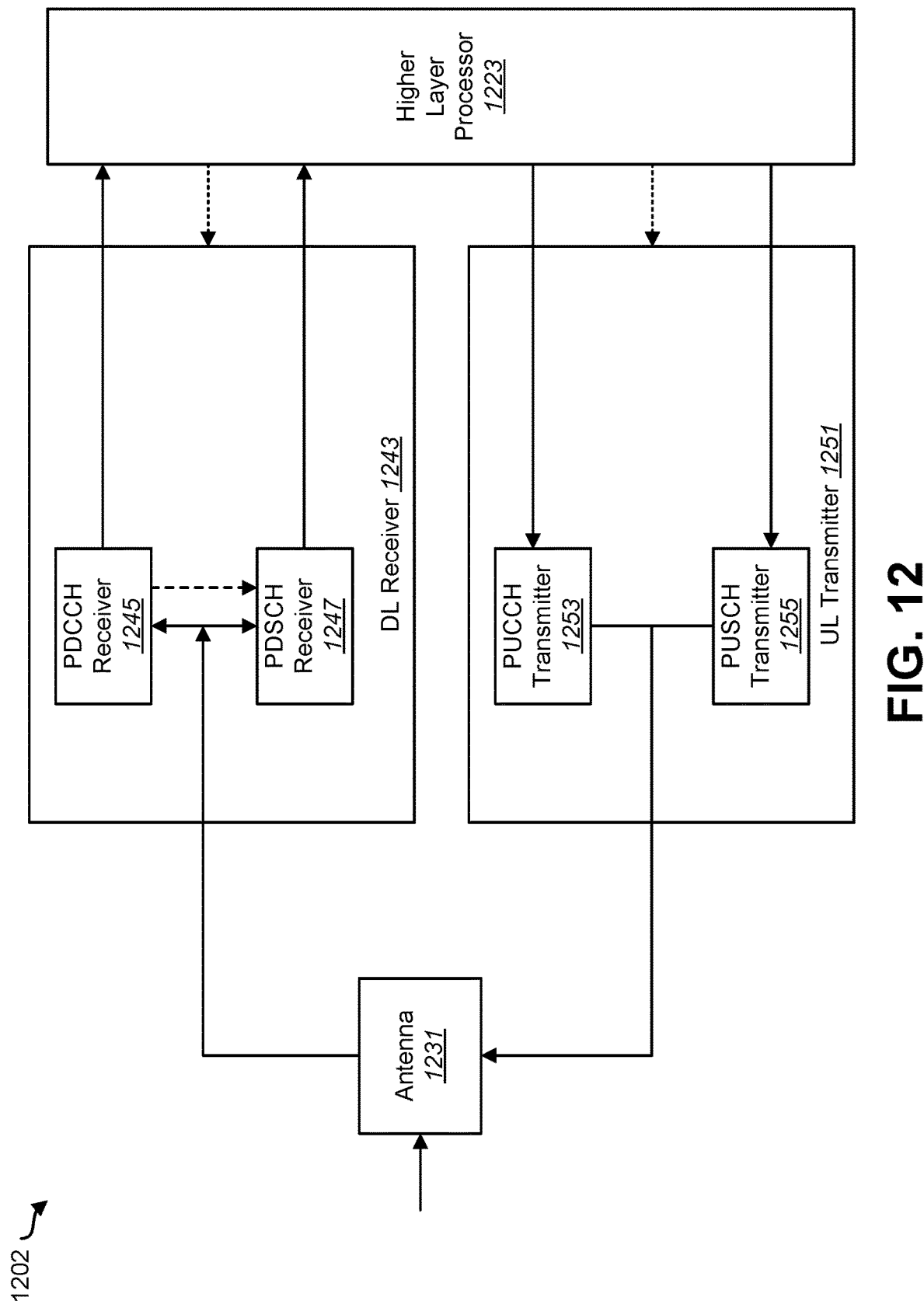
FIG. 12 is a block diagram illustrating one implementation of a UE.

FIG. 12 is a block diagram illustrating one implementation of a UE 1202. The UE 1202 may include a higher layer processor 1223, a UL transmitter 1251, a DL receiver 1243, and one or more antenna 1231. The UL transmitter 1251 may include a PUCCH transmitter 1253 and a PUSCH transmitter 1255. The DL receiver 1243 may include a PDCCH receiver 1245 and a PDSCH receiver 1247.

The higher layer processor 1223 may manage physical layer's behaviors (the UL transmitter's and the DL receiver's behaviors) and provide higher layer parameters to the physical layer. The higher layer processor 1223 may obtain transport blocks from the physical layer. The higher layer processor 1223 may send/acquire higher layer messages such as an RRC message and MAC message to/from a UE's higher layer. The higher layer processor 1223 may provide the PUSCH transmitter transport blocks and provide the PUCCH transmitter 1253 UCI.

The DL receiver 1243 may receive multiplexed downlink physical channels and downlink physical signals via receiving antennas 1231 and de-multiplex them. The PDCCH receiver 1245 may provide the higher layer processor 1223 downlink control information (DCI). The PDSCH receiver 1247 may provide the higher layer processor 1223 received transport blocks.

It should be noted that names of physical channels described herein are examples. The other names such as "NRPDCCH, NRPDSCH, NRPUCCH and NRPUSCH", "new Generation-(G) PDCCH, GPDSCH, GPUCCH and GPUSCH" or the like can be used.

Figure 13:
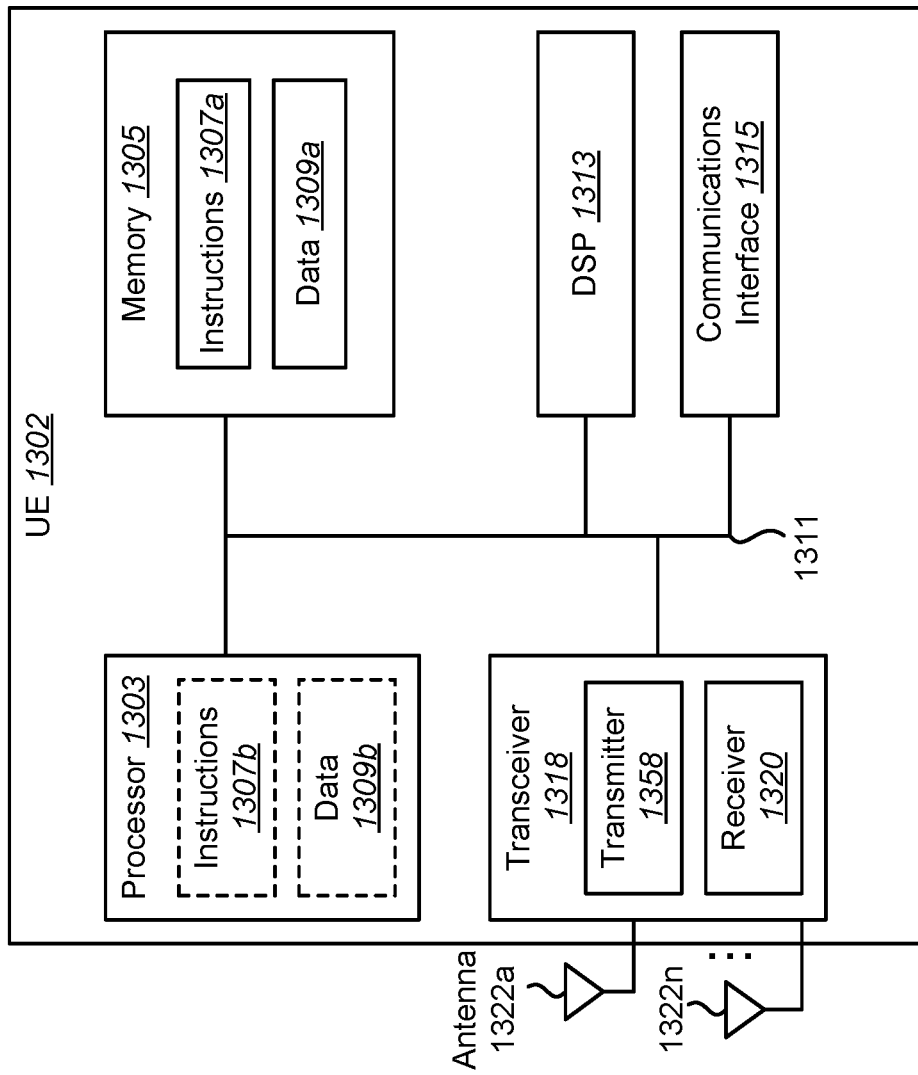
FIG. 13 illustrates various components that may be utilized in a UE.

FIG. 13 illustrates various components that may be utilized in a UE 1302. The UE 1302 described in connection with FIG. 13 may be implemented in accordance with the UE 102 described in connection with FIG. 1. The UE 1302 includes a processor 1303 that controls operation of the UE 1302. The processor 1303 may also be referred to as a central processing unit (CPU). Memory 1305, which may include read-only memory (ROM), random access memory (RAM), a combination of the two or any type of device that may store information, provides instructions 1307a and data 1309a to the processor 1303. A portion of the memory 1305 may also include non-volatile random access memory (NVRAM). Instructions 1307b and data 1309b may also reside in the processor 1303. Instructions 1307b and/or data 1309b loaded into the processor 1303 may also include instructions 1307a and/or data 1309a from memory 1305 that were loaded for execution or processing by the processor 1303. The instructions 1307b may be executed by the processor 1303 to implement the methods described above.

The UE 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322a-n are attached to the housing and electrically coupled to the transceiver 1318.

The various components of the UE 1302 are coupled together by a bus system 1311, which may include a power bus, a control signal bus and a status signal bus, in addition to a data bus. However, for the sake of clarity, the various buses are illustrated in FIG. 13 as the bus system 1311. The UE 1302 may also include a digital signal processor (DSP) 1313 for use in processing signals. The UE 1302 may also include a communications interface 1315 that provides user access to the functions of the UE 1302. The UE 1302 illustrated in FIG. 13 is a functional block diagram rather than a listing of specific components.

Figure 14:
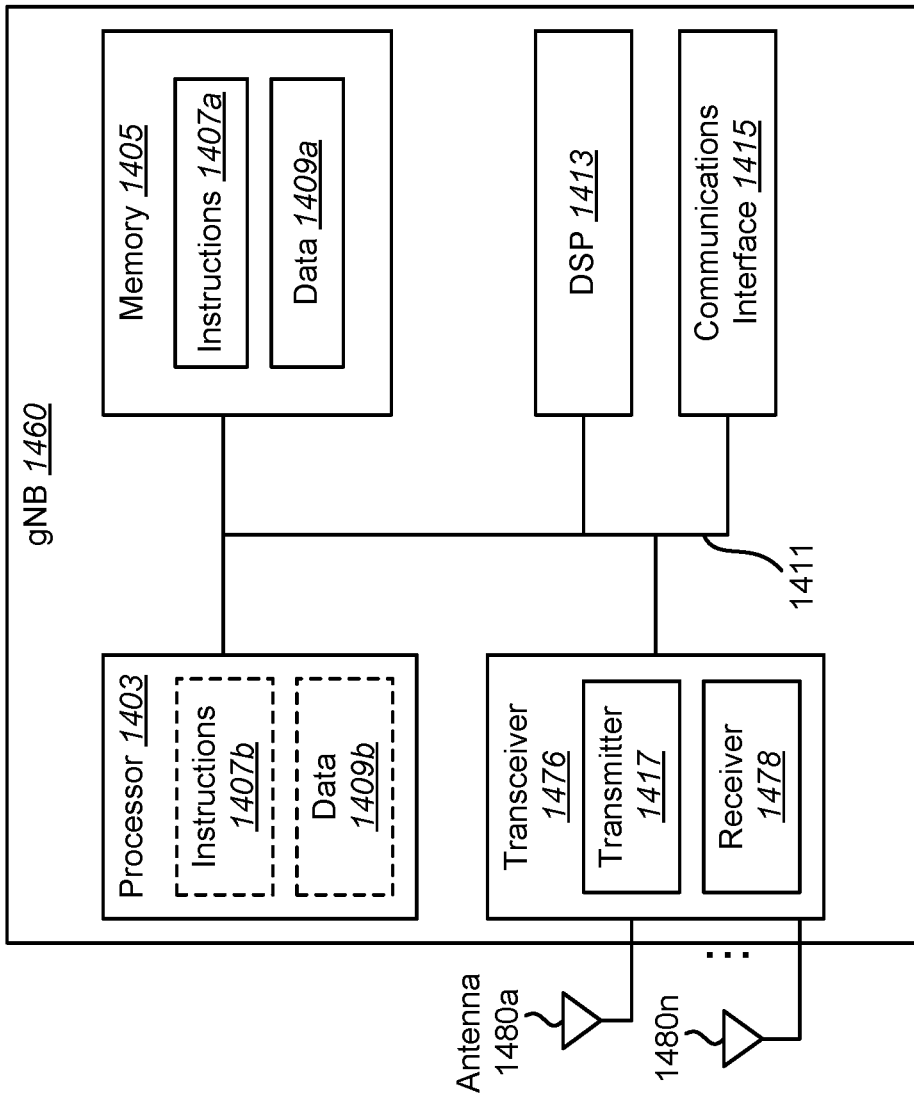
FIG. 14 illustrates various components that may be utilized in a gNB.

FIG. 14 illustrates various components that may be utilized in a gNB 1460. The gNB 1460 described in connection with FIG. 14 may be implemented in accordance with the gNB 160 described in connection with FIG. 1. The gNB 1460 includes a processor 1403 that controls operation of the gNB 1460. The processor 1403 may also be referred to as a central processing unit (CPU). Memory 1405, which may include read-only memory (ROM), random access memory (RAM), a combination of the two or any type of device that may store information, provides instructions 1407a and data 1409a to the processor 1403. A portion of the memory 1405 may also include non-volatile random access memory (NVRAM). Instructions 1407b and data 1409b may also reside in the processor 1403. Instructions 1407b and/or data 1409b loaded into the processor 1403 may also include instructions 1407a and/or data 1409a from memory 1405 that were loaded for execution or processing by the processor 1403. The instructions 1407b may be executed by the processor 1403 to implement the methods described above.

The gNB 1460 may also include a housing that contains one or more transmitters 1417 and one or more receivers 1478 to allow transmission and reception of data. The transmitter(s) 1417 and receiver(s) 1478 may be combined into one or more transceivers 1476. One or more antennas 1480a-n are attached to the housing and electrically coupled to the transceiver 1476.

The various components of the gNB 1460 are coupled together by a bus system 1411, which may include a power bus, a control signal bus and a status signal bus, in addition to a data bus. However, for the sake of clarity, the various buses are illustrated in FIG. 14 as the bus system 1411. The gNB 1460 may also include a digital signal processor (DSP) 1413 for use in processing signals. The gNB 1460 may also include a communications interface 1415 that provides user access to the functions of the gNB 1460. The gNB 1460 illustrated in FIG. 14 is a functional block diagram rather than a listing of specific components.

Figure 15:
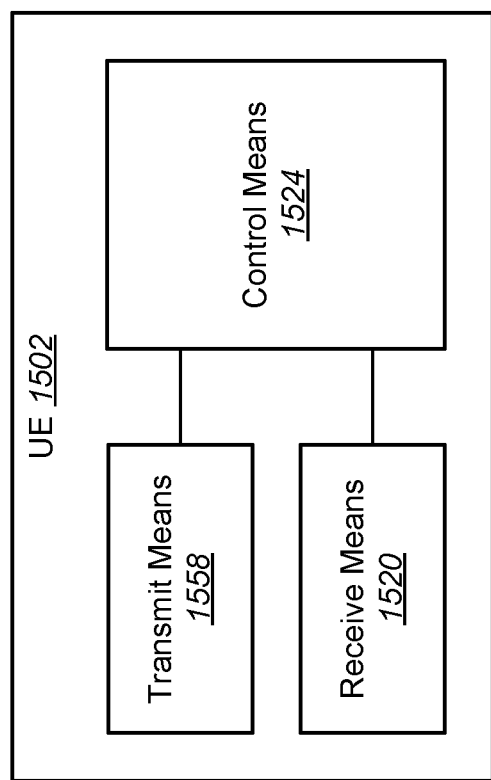
FIG. 15 is a block diagram illustrating one implementation of a UE in which systems and methods for PUCCH format adaptation for 5G NR may be implemented.

FIG. 15 is a block diagram illustrating one implementation of a UE 1502 in which systems and methods for PUCCH format adaptation for 5G NR may be implemented. The UE 1502 includes transmit means 1558, receive means 1520 and control means 1524. The transmit means 1558, receive means 1520 and control means 1524 may be configured to perform one or more of the functions described in connection with FIG. 1 above. FIG. 13 above illustrates one example of a concrete apparatus structure of FIG. 15. Other various structures may be implemented to realize one or more of the functions of FIG. 1. For example, a DSP may be realized by software.

Figure 16:
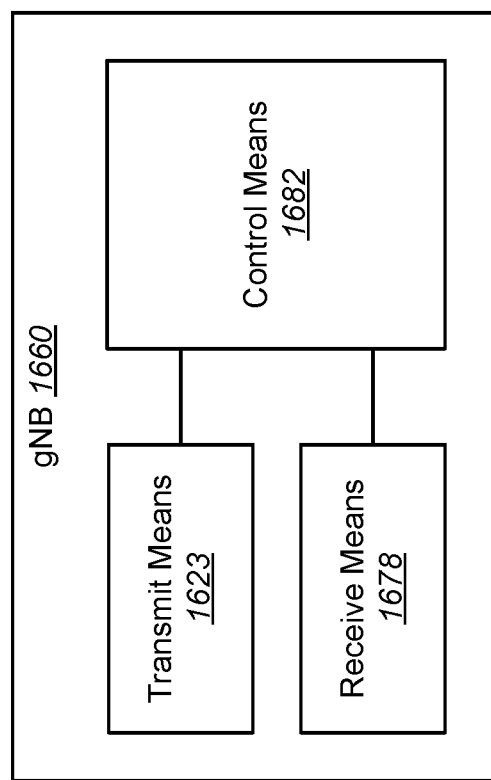
FIG. 16 is a block diagram illustrating one implementation of a gNB in which systems and methods for PUCCH format adaptation for 5G NR may be implemented.

FIG. 16 is a block diagram illustrating one implementation of a gNB 1660 in which systems and methods for PUCCH format adaptation for 5G NR may be implemented. The gNB 1660 includes transmit means 1617, receive means 1678 and control means 1682. The transmit means 1617, receive means 1678 and control means 1682 may be configured to perform one or more of the functions described in connection with FIG. 1 above. FIG. 14 above illustrates one example of a concrete apparatus structure of FIG. 16. Other various structures may be implemented to realize one or more of the functions of FIG. 1. For example, a DSP may be realized by software.

Figure 17:
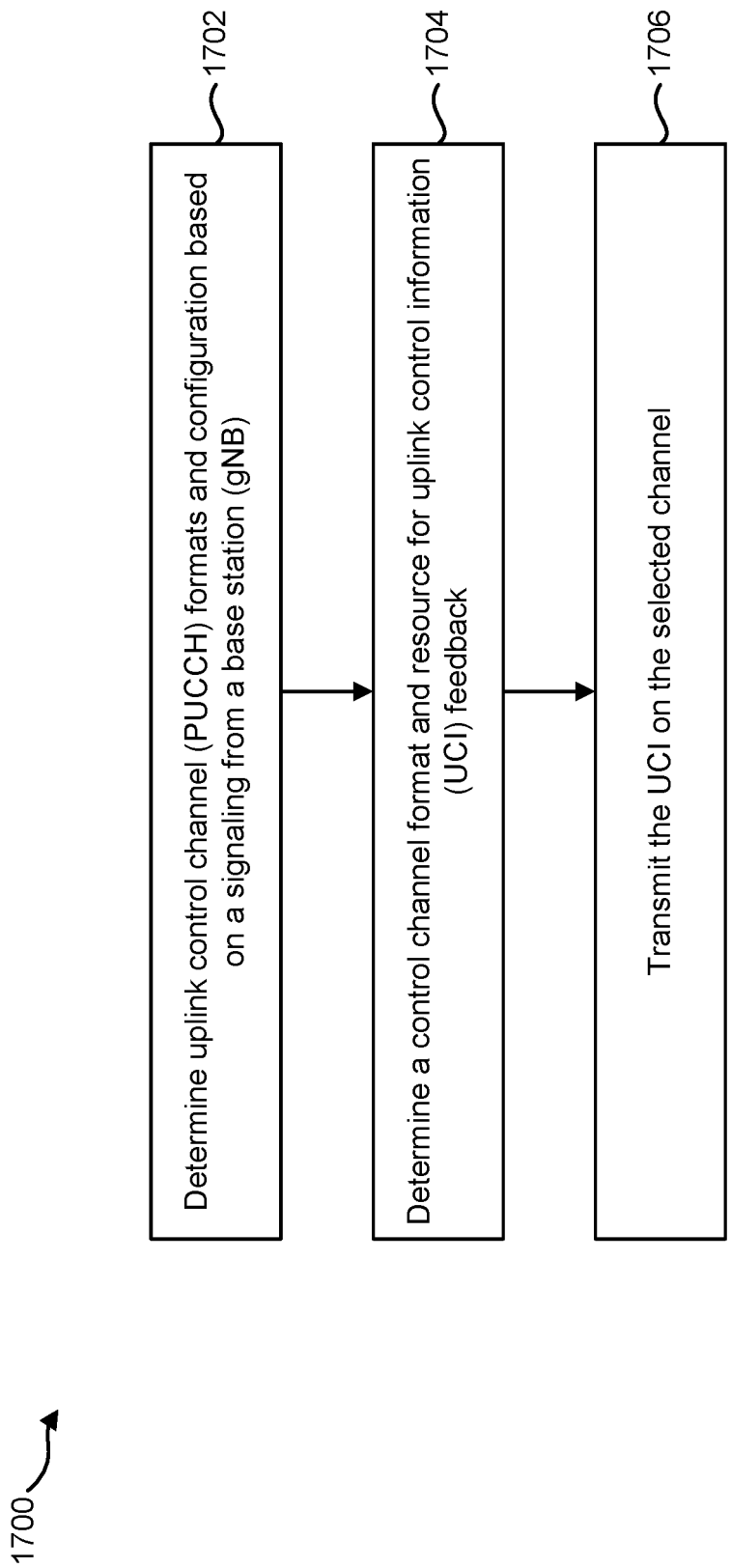
FIG. 17 is a flow diagram illustrating a method for PUCCH format adaptation for 5G NR.

FIG. 17 is a flow diagram illustrating a method 1700 for PUCCH format adaptation for 5G NR. The method 1700 may be implemented by a UE 102.

The UE 102 may determine 1702 uplink control channel (PUCCH) formats and configuration based on a signaling from a base station (gNB) 160. For example, the UE 102 may receive a configuration signaling from the gNB 160 with one or multiple PUCCH resources or sets of PUCCH resources with different PUCCH payload capacity. The PUCCH resource may have a short PUCCH format or a long PUCCH format. The PUCCH resource may have different aggregation levels of the same format and/or structure. The short PUCCH format and the long PUCCH format may have the same or different waveforms and/or numerologies. For HARQ-ACK reporting of carrier aggregation and/or multiple PDSCH transmissions in a carrier, the gNB 160 signals to the UE 102 on a total number of PDSCH transmissions for a HARQ-ACK reporting.

The UE 102 may determine 1704 a control channel format and resource for uplink control information (UCI) feedback. For example, the control channel format and a resource for HARQ-ACK feedback may be implicitly determined by a HARQ-ACK feedback status.

In an implementation for code block group (CBG)-based HARQ-ACK reporting of a single physical downlink shared channel (PDSCH) transmission, if all CBGs in a transport block (TB) are reported as ACK, a single ACK is reported for the TB on a PUCCH format and resource with up to 2 bits of payload. In another implementation for CBG-based HARQ-ACK reporting of a single PDSCH transmission, if a NACK is reported for any CBG in a TB, the HARQ-ACK of at least all transmitted CBGs are reported on a PUCCH format resource with a higher payload.

In an implementation for HARQ-ACK feedback of a multiple PDSCH transmission, if all TBs of the PDSCHs are reported as ACK, a single ACK is reported for all PDSCHs on a PUCCH format and resource with up to 2 bits of payload. In another implementation for HARQ-ACK feedback of a multiple PDSCH transmission, if a NACK is reported for any TB in any PDSCH, the HARQ-ACK of at least all transmitted PDSCHs are reported on a PUCCH format resource with a higher payload.

The control channel format and resource for HARQ-ACK feedback may be implicitly determined by the scheduling space for CBG-based HARQ-ACK. If a PDSCH is scheduled in common search space (CSS) or UE-group search space, the UE 102 may report only one bit per TB or per PDSCH on a PUCCH format with up to two bits of UCI payload. If the PDSCH is scheduled in UE-specific search space (USS), the UE 102 may report HARQ-ACK bits for at least all transmitted CBGs on a PUCCH format with up to two bits of UCI payload.

In one approach, the control channel format and resource for UCI feedback is implicitly determined by the payload size of a UCI reporting among configured PUCCH resources with different formats and payload sizes. In another approach, the control channel format and resource with a given payload capacity is explicitly signaled by the gNB 160 for UCI feedback.

The UE 102 may transmit 1706 the UCI on the selected channel.

Figure 18:
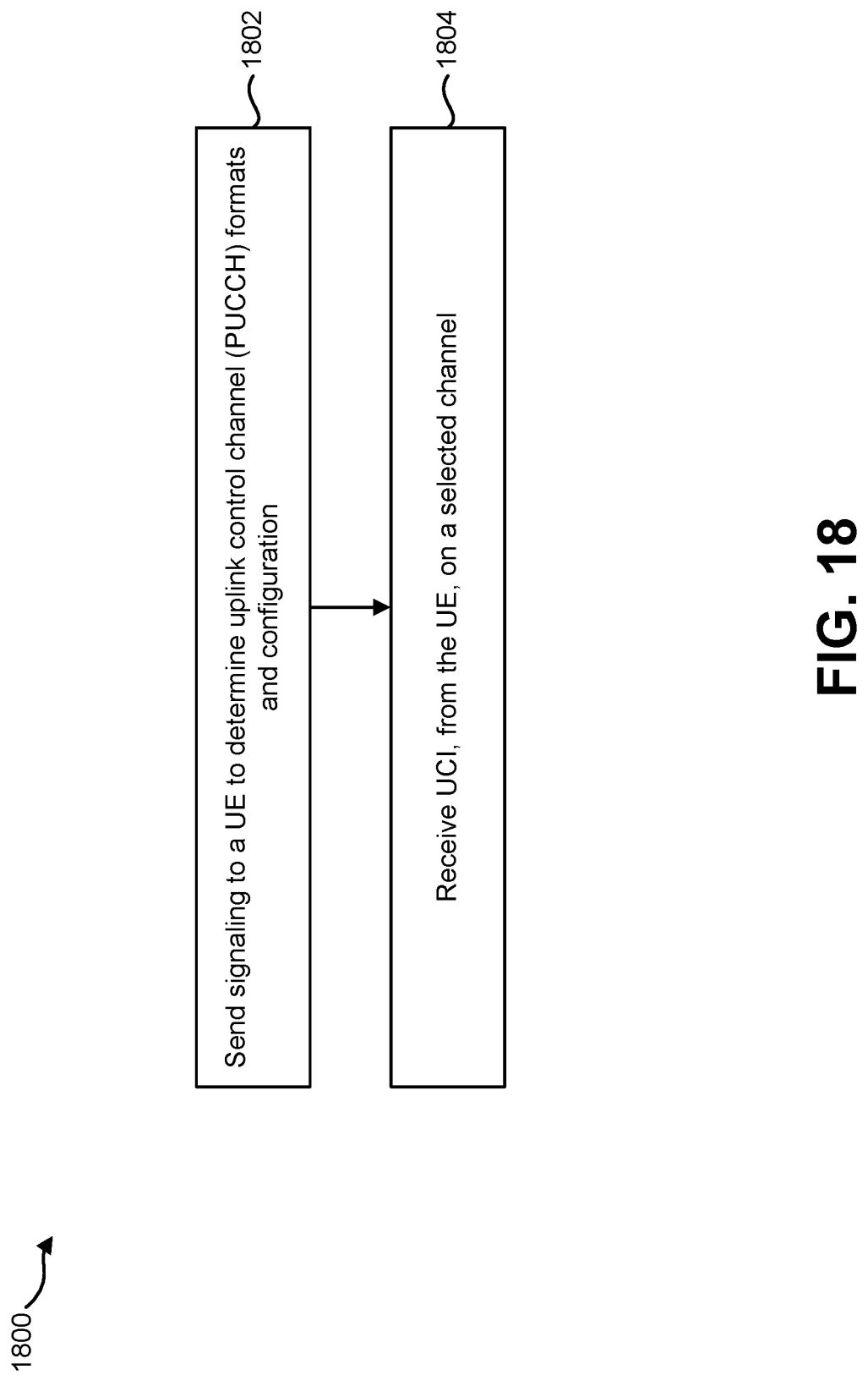
FIG. 18 is a flow diagram illustrating another method for PUCCH format adaptation for 5G NR.

FIG. 18 is a flow diagram illustrating another method 1800 for PUCCH format adaptation for 5G NR. The method 1800 may be implemented by a base station (gNB) 160.

The gNB 160 may send 1802 signaling to a UE 102 to determine uplink control channel (PUCCH) formats and configuration.

The gNB 160 may receive 1804 UCI, from the UE 102, on a selected channel. The UE determines uplink control channel (PUCCH) formats and configuration based on the signaling from the gNB 160. The UE 102 also determines a control channel format and resource for the UCI feedback. This may be accomplished as described in connection with FIG. 17.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment (UE), comprising:
receiving circuitry configured to receive a physical downlink shared channel (PDSCH) that includes code block groups (CBGs) of a transport block; and
transmitting circuitry configured to transmit CBG based HARQ-ACK, wherein
for the CBG based HARQ-ACK corresponding to the PDSCH which is scheduled in a common search space (CSS), the transmitting circuitry is configured to report one HARQ-ACK bit for the transport block,
for the CBG based HARQ-ACK corresponding to the PDSCH which is scheduled in a UE-specific search space (USS), the transmitting circuitry is configured to report HARQ-ACK bits of all CBGs.

2. The UE of claim 1, wherein determining circuitry configured to determine a physical uplink control channel (PUCCH) resource for transmission of the CBG based HARQ-ACK which PUCCH resource is one of a plurality PUCCH resources defined for different payload sizes.

3. A base station (gNB), comprising:
sending circuitry configured to send a physical downlink shared channel (PDSCH) that includes code block groups (CBGs) of a transport block; and
receiving circuitry configured to receive CBG based HARQ-ACK, wherein
for the CBG based HARQ-ACK corresponding to the PDSCH which is scheduled in a common search space (CSS), the receiving circuitry is configured to receive one HARQ-ACK bit for the transport block,
for the CBG based HARQ-ACK corresponding to the PDSCH which is scheduled in a UE-specific search space (USS), the receiving circuitry is configured to receive HARQ-ACK bits of all CBGs.

4. A communication method of a user equipment (UE) comprising:
receiving a physical downlink shared channel (PDSCH) that includes code block groups (CBGs) of a transport block; and
transmitting CBG based HARQ-ACK, wherein
for the CBG based HARQ-ACK corresponding to the PDSCH which is scheduled in a common search space (CSS), one HARQ-ACK bit for the transport block is transmitted,
for the CBG based HARQ-ACK corresponding to the PDSCH which is scheduled in a UE-specific search space (USS), HARQ-ACK bits of all CBGs are transmitted.

5. A communication method of a base station comprising:
sending a physical downlink shared channel (PDSCH) that includes code block groups (CBGs) of a transport block; and
receiving CBG based HARQ-ACK, wherein
for the CBG based HARQ-ACK corresponding to the PDSCH which is scheduled in a common search space (CSS), one HARQ-ACK bit for the transport block is received,
for the CBG based HARQ-ACK corresponding to the PDSCH which is scheduled in a UE-specific search space (USS), HARQ-ACK bits of all CBGs are received.

* * * * *